[12] United States Patent
Petitto

(10) Patent No.: US 6,602,040 B1
(45) Date of Patent: Aug. 5, 2003

(54) METHOD AND APPARATUS FOR TRANSPORTING MATERIALS IN A MINE

(75) Inventor: Angelo A. Petitto, Morgantown, WV (US)

(73) Assignee: Petitto Mine Equipment, Inc., Morgantown, WV (US)

( * ) Notice: Subject to any disclaimer, the term of this patent is extended or adjusted under 35 U.S.C. 154(b) by 0 days.

(21) Appl. No.: 09/416,695

(22) Filed: Oct. 12, 1999

(51) Int. Cl.⁷ .................................................. B60P 1/00
(52) U.S. Cl. ........................ 414/517; 414/521; 414/539; 414/723
(58) Field of Search ................................. 414/509, 511, 414/517, 539, 521, 525.1, 723; 100/218; 254/93 R; 37/903

(56) References Cited

U.S. PATENT DOCUMENTS

| | | | |
|---|---|---|---|
| 3,349,931 A | * 10/1967 | Wagner | 414/517 X |
| 4,011,957 A | * 3/1977 | Bendtsen | 414/511 X |
| 4,090,627 A | * 5/1978 | Teti | 414/517 X |
| 4,199,299 A | 4/1980 | Petitto, Sr. et al. | |
| 4,252,475 A | 2/1981 | Cobb et al. | |
| 4,411,583 A | 10/1983 | Petitto, Sr. et al. | |
| 4,627,783 A | * 12/1986 | De Filippi | 414/511 X |
| 4,799,850 A | 1/1989 | Petitto, Sr. et al. | |
| 4,877,366 A | * 10/1989 | De Filippi | 414/511 X |
| 4,995,783 A | 2/1991 | Petitto et al. | |
| 5,076,749 A | 12/1991 | Petitto et al. | |

FOREIGN PATENT DOCUMENTS

JP 58-183324 * 10/1983 .................. 414/517

* cited by examiner

Primary Examiner—James W. Keenan
(74) Attorney, Agent, or Firm—Price & Adams

(57) ABSTRACT

A self-propelled vehicle transports materials and equipment loaded onboard the vehicle to a desired location in an underground mine. A low profile frame is propelled by endless tracks which support a solid deck divided into a materials handling platform and an operator's station. The deck is open at the rearward end of the vehicle frame to facilitate loading and unloading of equipment and materials. A boom assembly is mounted at the front end of the frame adjacent to the operator's compartment. A free end of the boom assembly is connected to a suitable materials handling device. The materials handling device ranges from a hook mechanism for engaging and pulling heavy loads onto the deck to a bulldozer-type blade for pushing heavy equipment and loose materials off of the deck. The boom assembly includes a parallel spaced arrangement of piston cylinder assemblies. The piston cylinder assemblies are supported by individual housings within the boom assembly to resist twisting and bending in the operations of loading and unloading heavy equipment and materials onto the deck. The boom assembly is operable to engage heavy equipment, such as a longwall shield, and pull the equipment onto the deck for transportation to the mine face where it is off loaded. This overcomes the disadvantages and hazards of towing large equipment on the ground from the rear of the vehicle.

17 Claims, 19 Drawing Sheets

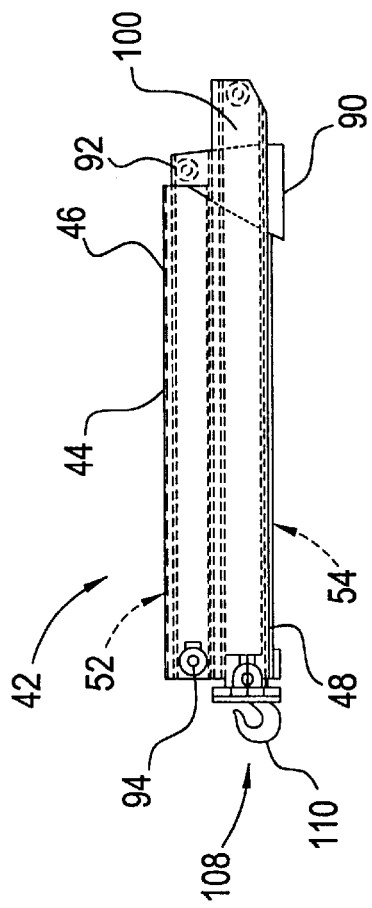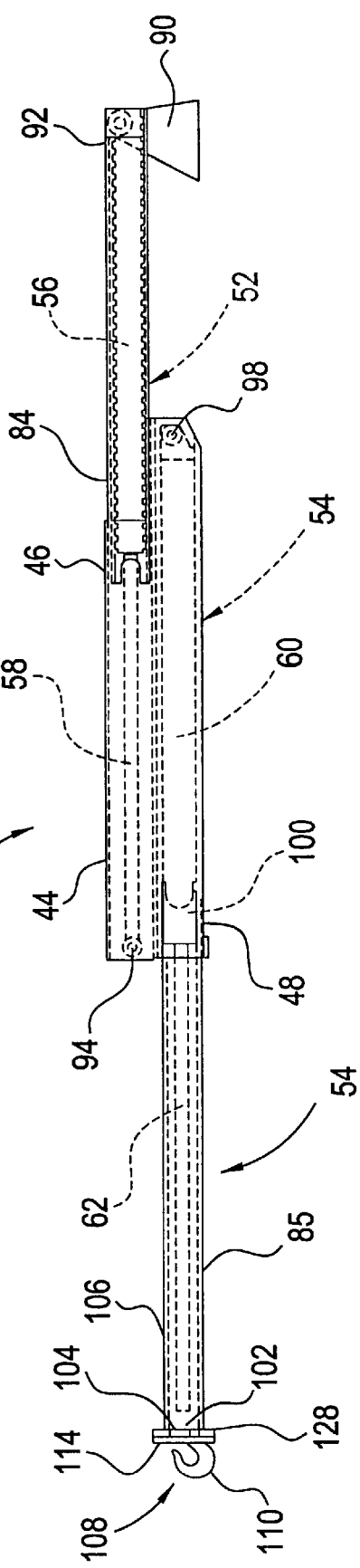

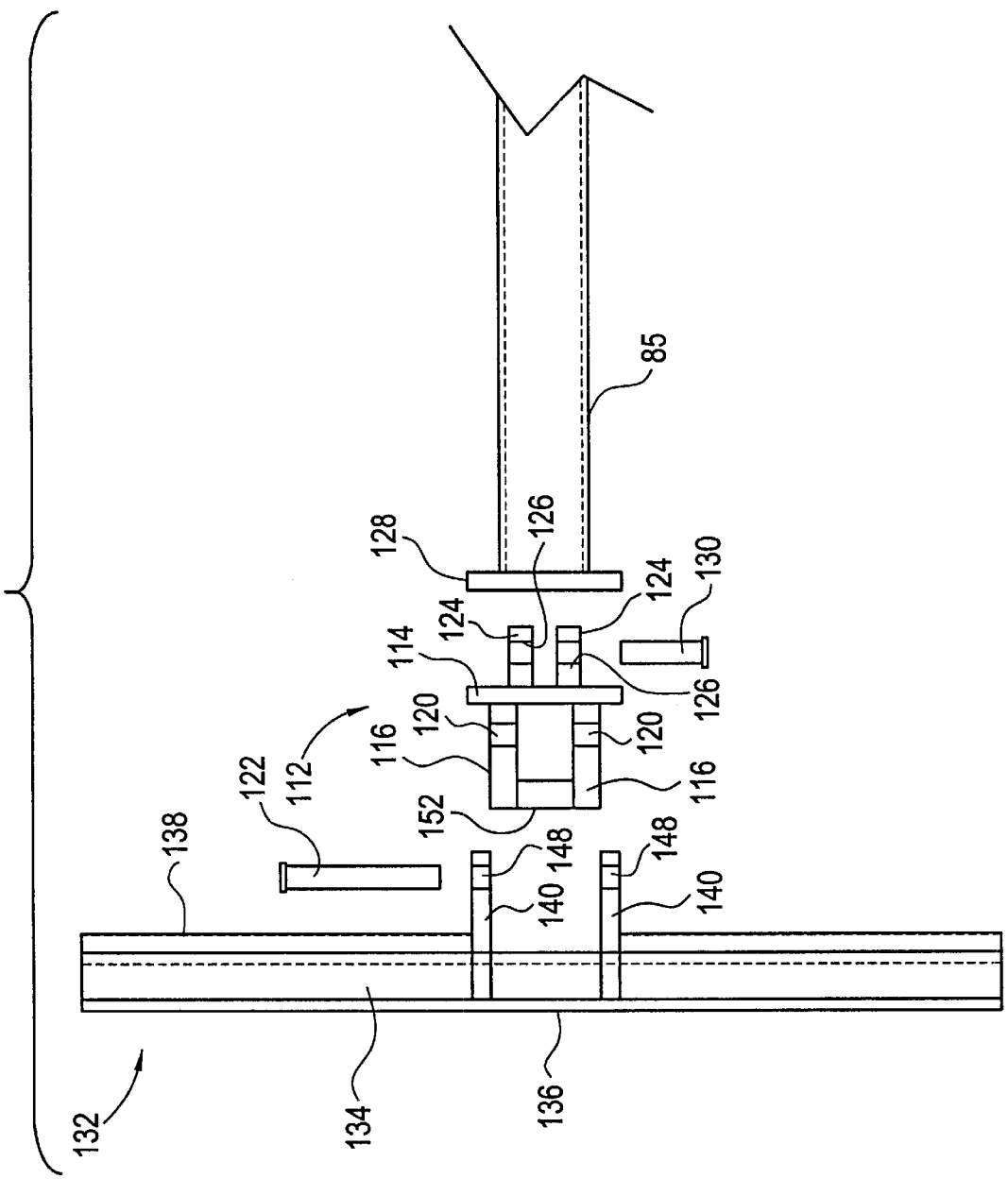

METHOD AND APPARATUS FOR TRANSPORTING MATERIALS IN A MINE

BACKGROUND OF THE INVENTION

1. Field Of the Invention

This invention relates to a method and apparatus for transporting materials, such as longwall mining shields and other equipment and material, in an underground mine, and more particularly, to a self-propelled vehicle maneuverable in an underground mine to unload and load equipment and materials onto a solid deck for transporting to a desired location in the mine.

2. Description of the Prior Art

Self-propelled vehicles for moving equipment and materials into and out of an underground mine are well known in the art, as disclosed in U.S. Pat. Nos. 4,199,299; 4,411,583; 4,799,850; 4,995,783; and 5,076,749. With each of these devices a self-propelled vehicle transports the mine material and equipment into and out of the mine. Preferably, the vehicle is propelled by a pair of endless tracks. The vehicle is maneuverable to safely and efficiently transport equipment or materials into and out of the mine and to any desired location in the mine up to the mine face.

The traction vehicle is equipped with a selected materials handling and transporting device. The track propelled vehicle is particularly adapted in the assembly and disassembly of of longwall mining systems that include various components such as shields, pans, cribbing, roof supports, conveyors, and the like.

The machines disclosed in U.S. Pat. Nos. 4,199,299 and 4,799,850 feature a boom assembly that extends from the body of a track propelled vehicle maneuverable in an underground mine. A pivot arrangement supports the boom assembly for lateral movement from the rear end of the vehicle. One or more piston assemblies are used to raise and lower the boom assembly and swing the boom assembly horizontally. Housed within the boom assembly is a single piston cylinder connected to telescoping sections which allow for longitudinal extension and retraction of the assembly from the free end of the vehicle for movement of a material engaging device.

With the above-described vehicle, the preferred material engaging device connected to the free end of the boom assembly is a hook member rotatably positioned within a socket connected to the end of the boom assembly. The hook member is operable to assist in performing a number of lifting and moving operations, such as moving the components of a longwall mine system into and out of position at the mine face. The mining machine component is connected to the hook member by a chain at the end of the telescoping boom. As the vehicle is trammed, the mining machine component is towed behind the vehicle. The machine component is not loaded onto the vehicle for hauling.

The above-described self-propelled mine vehicle is modifiable from operations of moving longwall mining machine components to conducting materials handling operations, such as bulldozing, grading, transporting, and unloading operations. This is accomplished by removing the hook member from the telescoping boom and attaching a multi-purpose bucket as disclosed in U.S. Pat. No. 4,411,583. The multi-purpose bucket is connected to the end of the boom assembly for pivotal, lateral, and vertical movement relative to the vehicle frame.

The conversion from a hook member to a multi-purpose bucket on the end of the boom is readily accomplished through a quick release pin connection. The multi-purpose bucket extends rearwardly from the machine frame and is movable relative thereto by operation of the telescoping boom. The telescoping operation of the boom is performed by a single piston cylinder assembly housed within the boom.

The above-identified material handling mine vehicles perform material handling and transporting operations removed from the vehicle. The telescoping boom member engages the equipment or material, depending upon the type of attachment connected to the boom member, positioned on the ground behind the vehicle. The equipment is towed from behind the vehicle to the desired location in the mine. The equipment or material is not loaded onto the mobile frame.

U.S. Pat. Nos. 4,995,783 and 5,076,749 disclose a material transport vehicle having a material handling platform for carrying equipment and material on the vehicle, as opposed to towing the equipment positioned on the ground behind the vehicle. The material handling platform is pivotally attached to the front of the transport vehicle for vertically raising and lowering the platform, as well as tilting the platform horizontally forwardly and backwardly. A turntable is mounted on platform.

To position a piece of equipment on the material handling platform, a winch cable is extended from the vehicle over the handling platform and attached to the equipment to be carried on the platform. The platform is lowered on the ground and tilted to form an inclined surface for pulling the equipment, such as a mine roof support, from the ground onto the surface of the platform.

Once the equipment is loaded onto the platform, the platform is tilted to a horizontal position and raised out of contact with the ground. The vehicle is trammed to move the equipment to the desired location in the mine. At the desired location, the turntable is rotated so that the equipment is in the desired position when it is unloaded from the vehicle. Unloading is accomplished by lowering and tilting the platform in contact with the ground. The equipment is then slid from the material handling platform onto the ground.

The material handling platform disclosed in U.S. Pat. No. 4,995,783 extends forwardly from the vehicle frame. It is connected at one end to the vehicle frame for vertical movement relative to the ground as well as a tilted position relative to the ground. The material handling platform opposite the machine frame is unsupported. There is no provision for retracting the material handling platform with the load positioned thereon onto the body of the vehicle. The platform must be securely connected to the vehicle frame to support the equipment when the platform is elevated during tramming. The equipment extends forwardly from the vehicle and is not supported by the body of the vehicle. Consequently, the ability of the vehicle to transport equipment into and out of the mine is limited by the capacity of the handling platform that extends forwardly of the vehicle.

While the above-described material transport vehicles are suitable for carrying out a number of material handling operations in an underground mine, including the transportation of longwall mining components into the mine and maneuvering the components into position adjacent to the mine face, the current vehicles are limited in their capacity to transport mine equipment. There is a need for a materials transport vehicle capable of moving equipment weighing over 30-tons. Transport vehicles having a material handling platform extending forwardly of the vehicle cannot accommodate equipment of this size. Also, to tow a 30-ton longwall shield attached to a telescoping boom extending from a transport vehicle through the mine and into position adjacent to the mine face presents substantial difficulties and hazards to the equipment and operating personnel. This is particularly evident in towing and moving into position large shields when attached to the end of a telescopic boom. The boom is in an extended position when towing the shield through the mine. Once the shield has been moved to the desired location, it must be maneuvered into position by pivotal movement of the boom in either an extended or retracted position.

The load capacity of a conventional materials handling boom is limited to the single piston cylinder assembly encased in the boom. At the very most, the piston cylinder assembly is a multi-stage jack in which multiple cylinders extend one from another. With both arrangements, the entire load is applied to a single cylinder. The single cylinder must withstand substantial tortional forces tending to twist and bend the boom when pulling and pushing against the load. While it has been suggested, as disclosed in U.S. Pat. No. 4,252,475, to reinforce hydraulic cylinders by guide plates to resist buckling moments, a single piston cylinder assembly is utilized to control the range of movement of the load.

Therefore, there is need for a multi-purpose, self-propelled materials handling device maneuverable in an underground mine to safely and efficiently transport large components, such as longwall shields, a substantial distance through the mine. The mining equipment and material should be carried on the body of the vehicle rather than towed on the ground from the rear of the vehicle or supported in a suspended position at the front of the vehicle. In this manner the demands for moving large pieces of equipment throughout the mine can be safely and efficiently carried out.

SUMMARY OF THE INVENTION

In accordance with the present invention there is provided a materials transport vehicle for use in an underground mine that includes a mobile frame and a boom assembly extending longitudinally on the mobile frame. The boom assembly includes a boom housing having a first end portion and a second end portion. An extension mechanism is supported by the boom housing for movement between an extended position and a retracted position to extend and retract the boom member assembly. The extension mechanism has a first end portion connected to the mobile frame and a second end portion extending on the mobile frame forwardly from the first end portion. The extension mechanism includes a pair of piston cylinders positioned in overlying relation in said boom housing. A first piston cylinder has a fixed end portion pivotally connected to the mobile frame and an extensible end connected to the boom housing. A second piston cylinder underlies the first piston cylinder. The second piston cylinder has a fixed end connected to the boom housing and an extensible end extendable from the boom housing on the mobile frame. The extension mechanism is operable upon actuation to extend the first piston cylinder to extend the boom housing on the mobile frame and extend the second piston cylinder to extend the extendable end thereof from the boom housing to move the boom assembly from a retracted position to an extended position on the mobile frame.

Further in accordance with the present invention there is provided a method for extending and retracting a boom assembly on a materials transport vehicle that includes the steps of positioning a boom housing longitudinally on a mobile frame. The boom housing is connected to the mobile frame by a first piston cylinder assembly positioned in the boom housing. A second piston cylinder assembly is connected to the boom housing in underlying relation with the first piston cylinder assembly. The first piston cylinder assembly is actuated to advance the boom housing to an extended position on the mobile frame. The second piston cylinder assembly is actuated to extend an end portion thereof from the extended boom housing.

Further the present invention is directed to a mining equipment transporting apparatus that includes a mobile body portion having a longitudinally extending frame. A pair of ground traction devices are positioned laterally opposite one another on the mobile frame. A solid deck is positioned on the mobile frame for loading, transporting, and unloading mine materials and equipment on the body portion. The deck extends longitudinally and laterally between the ground traction devices. The deck has an operator end portion and an equipment receiving end portion. A boom assembly extends longitudinally on the solid deck. The boom assembly has a first end portion pivotally mounted on the deck operator end portion and a second end portion extending toward the deck equipment receiving end portion. Extensible means is provided for extending and retracting the boom assembly second end portion relative to the boom assembly first end portion. A material engaging device is connected to the boom assembly second end portion for engaging mine equipment to be loaded and unloaded on the deck for use in the mine. The boom assembly is movable between an extended position from the deck equipment receiving end portion to a retracted position on the deck adjacent to the deck operator end portion. The boom assembly is operable upon actuation with the material engaging device attached to the mining equipment to move from the extended position to the retracted position to load the mine equipment onto the deck between the pair of ground traction devices for transporting the mine equipment to a selected location in the mine. The boom assembly second end portion has an abutment surface for exerting a force upon the mine equipment on extension of the boom assembly from the retracted position to the extended position to move the mine equipment on the deck for unloading at the deck equipment receiving end portion.

Additionally, the present invention is directed to a materials transporting apparatus that includes a mobile body and a solid deck positioned on the mobile body for receiving and transporting materials. A boom member is pivotally mounted on the deck and has a free end portion extending above the deck. A hook mechanism is connected to the boom member free end portion for engaging material to be moved onto and off of the deck. The hook mechanism includes a socket assembly attached to the boom member free end portion. The socket assembly has a cavity for pivotally receiving a hook attached to the socket assembly. The hook is pivotally movable on the socket assembly between a retracted position in the cavity and an extended position from the cavity. The socket assembly has an abutment surface surrounding the cavity for applying a ramming force to displace material from the deck when the hook is in the retracted position on the socket assembly.

Accordingly, a principal object of the present invention is to provide method and apparatus for loading, transporting, and unloading equipment and materials on a self-propelled vehicle in an underground mine.

Another object of the present invention is to provide a self-propelled materials transport vehicle for use in an underground mine in which an extensible boom is positioned on a loading deck between propelling tracks of the vehicle to load onto the deck equipment which is then transported to a desired location in the mine and unloaded onto the mine floor by operation of the boom member.

A further object of the present invention is to provide a track-driven vehicle for transporting longwall shields and other components on the vehicle into and out of position adjacent a longwall mining machine in an underground mine.

Additionally, the present invention is directed to a self-propelled vehicle having a materials loading and unloading mechanism capable of receiving loose material on a haulage deck of the vehicle for transporting to a desired location where the equipment is unloaded for use.

A further object of the present invention is to provide a self-propelled materials transport device for use in an underground mine in which an extensible boom has a capacity to load and unload onto the deck of the vehicle large tonnage equipment for retrieval and installation at a desired location in an underground mine.

These and other objects of the present invention will be more completely disclosed and described in the following specification, the accompanying drawings, and the appended claims.

BRIEF DESCRIPTION OF THE DRAWINGS

FIG. 3 is a view in side elevation of the telescoping boom assembly shown in FIGS. 1 and 2, illustrating a stacked arrangement of piston cylinder assemblies in a boom housing with a hook mechanism secured to the end of the lower piston cylinder assembly.

FIG. 4 is a view in side elevation of the boom assembly shown in FIG. 3, illustrating the boom in a fully extended position.

FIG. 8 is a fragmentary, exploded plan view of the boom assembly shown in FIG. 6, illustrating the connection of the pusher plate to the end of the boom.

DESCRIPTION OF THE PREFERRED EMBODIMENTS

Figure 1:
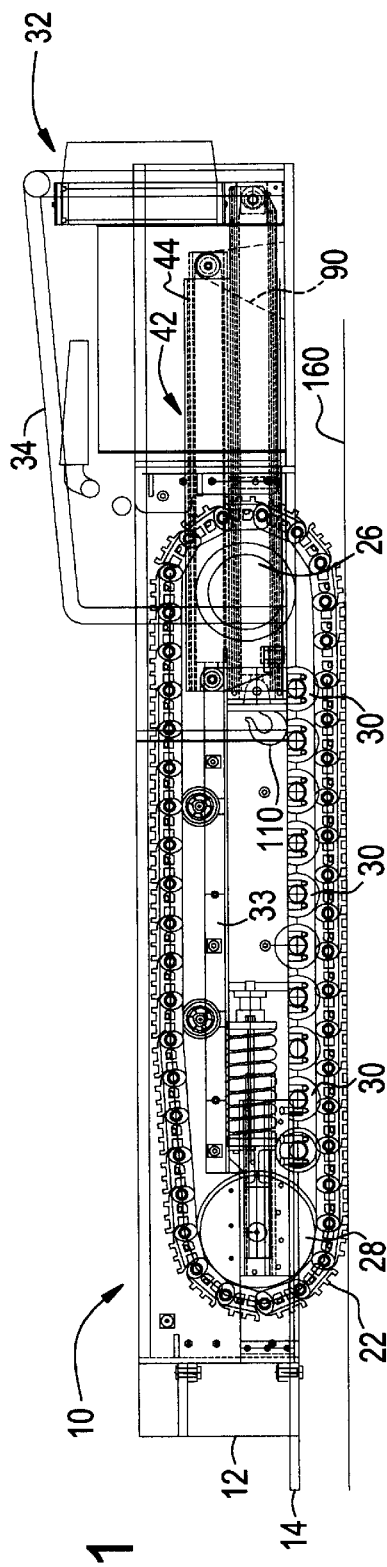
FIG. 1 is a view in side elevation of a self-propelled vehicle for use in materials handling operations in an underground mine, illustrating a telescoping boom assembly for engaging equipment and material for movement onto and off of a solid deck of the vehicle.
Figure 2:
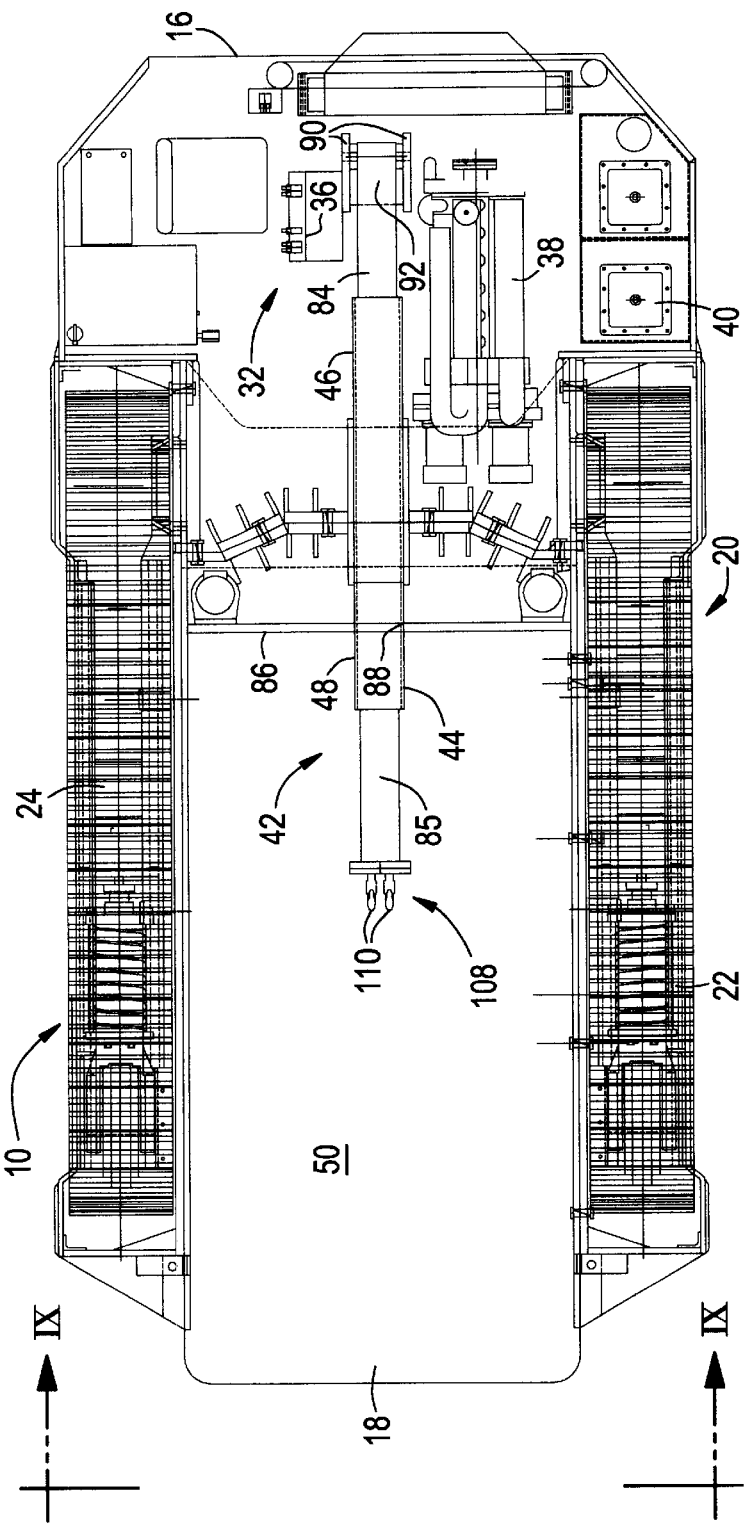
FIG. 2 is the plan view of the materials handling vehicle shown in FIG. 1, illustrating a materials handling device attached to the end of the telescoping boom for engaging equipment to be loaded onto the deck for transporting.

Referring to the drawings and, particularly to FIGS. 1 and 2, there is illustrated a materials handling vehicle generally designated by the numeral 10 for use in underground mining operations and other types of materials transporting operations. The materials handling vehicle 10 includes a mobile body portion 12 having a low profile, longitudinally extending frame 14. The frame 14 has a front end 16 and a rearward end 18. The frame 14 is mounted on ground engaging traction devices 20, such as a pair of propelling endless tracks 22 and 24. Each of the tracks 22 and 24 is reeved about a drive sprocket 26 and an idler sprocket 28 and supported by idler rollers 30 rotatably mounted on a frame 33 that extends between and is connected to the sprockets 26 and 28. The idler rollers 30 support the upper and lower reaches of each endless track as it turns in a preselected direction upon rotation of the drive sprocket 26.

The drive sprocket 26 for each endless track 22 and 24 is drivingly connected in a conventional manner to a suitable prime mover, such as a diesel powered motor or an electric motor which is mounted on the vehicle frame 14. With an electrical motor, power is supplied in a conventional manner through a trailing electrical cable wound upon a cable reel (not shown) mounted on the frame 14.

An operator's station generally designated by the numeral 32 is located at the frame front end 16. As shown in FIG. 1, a protective canopy 34 is mounted on the frame 14 and extends over the station 32. The operator's station 32 is provided with controls 36 for propelling and steering the vehicle, as well as for carrying out the materials handling operations in accordance with the present invention.

As illustrated in FIG. 2, a prime mover in the embodiment of a diesel engine 38 is mounted on the frame 14 of the operator's station 32. The diesel engine 38 conventionally operates fluid pumps and supplies fluid under pressure to various fluid operated devices on the vehicle 10, such as the piston cylinder assemblies provided on the mobile body portion 12. The fluid pumps supply fluid, such as hydraulic oil, from a tank 40 mounted on the frame 14 through conventional hydraulic conduits (not shown) to the various fluid operated devices. The controls 36 are operated to supply fluid to the fluid operated devices.

As shown in FIG. 2, a telescoping boom assembly generally designated by the numeral 42 extends longitudinally on the frame 14 from the frame front end 16 rearwardly toward the frame rearward end 18. The boom assembly 42 is illustrated in greater detail in FIGS. 3–5 and includes a main housing 44 having a first end portion 46 and a second end portion 48. The first end portion 46 extends toward the frame front end 16 for pivotal connection at the operator's station 32. The housing second end portion 48 extends toward the vehicle frame rearward end 18 to position the free end portion of the boom assembly 42 in overlying relation with a solid deck 50 that forms a materials handling platform.

The deck 50 extends longitudinally on the frame 14 between the front end 16 and the rearward end 18 and laterally between the endless tracks 22 and 24. In one embodiment, this arrangement provides a solid platform supported by the vehicle frame 14 between the traction devices 20 for supporting heavy loads in the range of 30 to 40 tons with a maximum cargo width of up to two meters.

As described later in greater detail, the deck 50 forming the materials handling platform has the capacity to transport mining equipment and materials into and out of the mine. The materials handling platform 50 is particularly adapted with the provision of the telescoping boom assembly 42 to load and unload on the deck 50 longwall mining machine components. Components such as shields, pans, cribbing, conveyors, and other types of roof supports are transported by the vehicle 10 from the mine entry and maneuvered into position adjacent to the mine face.

In accordance with the present invention, the transporting of equipment and materials is accomplished without the need to tow the equipment on the ground behind the vehicle or support the equipment on a platform suspended forwardly or rearwardly from the vehicle. The load is centrally located on the mobile body 12 between the endless tracks 22 and 24.

As shown in FIG. 4, the boom assembly 42 operates in a telescopic manner by a stacked arrangement of a pair of piston cylinder assemblies generally designated by the numerals 52 and 54, respectively, and contained within the boom assembly main housing 44. This arrangement departs from the conventional telescoping boom assembly of a single piston cylinder assembly for extending and retracting movable sections of the boom. It also differs from a multi-stage jack in which multiple cylinders extend axially one from another to apply force to extend and retract the boom along a single line of action. Conventional telescopic booms have a limited capacity in moving heavy loads because the single piston cylinder tends to twist when the boom assembly is pivoted laterally under load.

With the present invention, a pair of piston cylinder assemblies 52 and 54 are stabilized by the surrounding structure of the boom assembly main housing 44. Because of their spaced parallel relationship and independent operation, the assemblies 52 and 54 are better able to resist lateral twisting forces applied to the boom assembly 42 than a conventional telescoping boom formed by a single piston cylinder assembly or a multi-stage jack. The disadvantage of the conventional arrangement is that all of the bending forces applied to the boom must be resisted by the piston cylinder assembly or multi-stage jack along a single axis of extension and retraction. With the present invention the parallel or stacked arrangement of piston cylinder assemblies distributes the bending forces to more than a single line of action of extension and retraction.

As illustrated in FIGS. 3 and 4, each of the piston cylinder assemblies 52 and 54 is conventional in construction. For example, assembly 52 includes a cylinder portion 56 and a piston 58. Similarly, assembly 54 includes a cylinder portion 60 and a piston 62. Accordingly, actuation in a conventional manner of assemblies 52 and 54 extends and retracts the pistons 58 and 62 from the cylinder portions 56 and 60, respectively.

In accordance with the present invention, the piston cylinder assemblies 52 and 54 are positioned in the boom assembly 42 in a spaced parallel overlying relationship. The piston cylinder assemblies 52 and 54 are laterally displaced in that the line of action of extension and retraction of the assemblies 52 and 54 is parallel and spaced apart.

FIGS. 3 and 4 illustrate the boom assembly 42 in the retracted and extended positions, respectively. In both positions the boom assembly main housing 44 maintains the piston cylinder assemblies 52 and 54 in a spaced parallel relationship. This is accomplished by partitioning the interior of the main housing 44 into two compartments.

Figure 5:
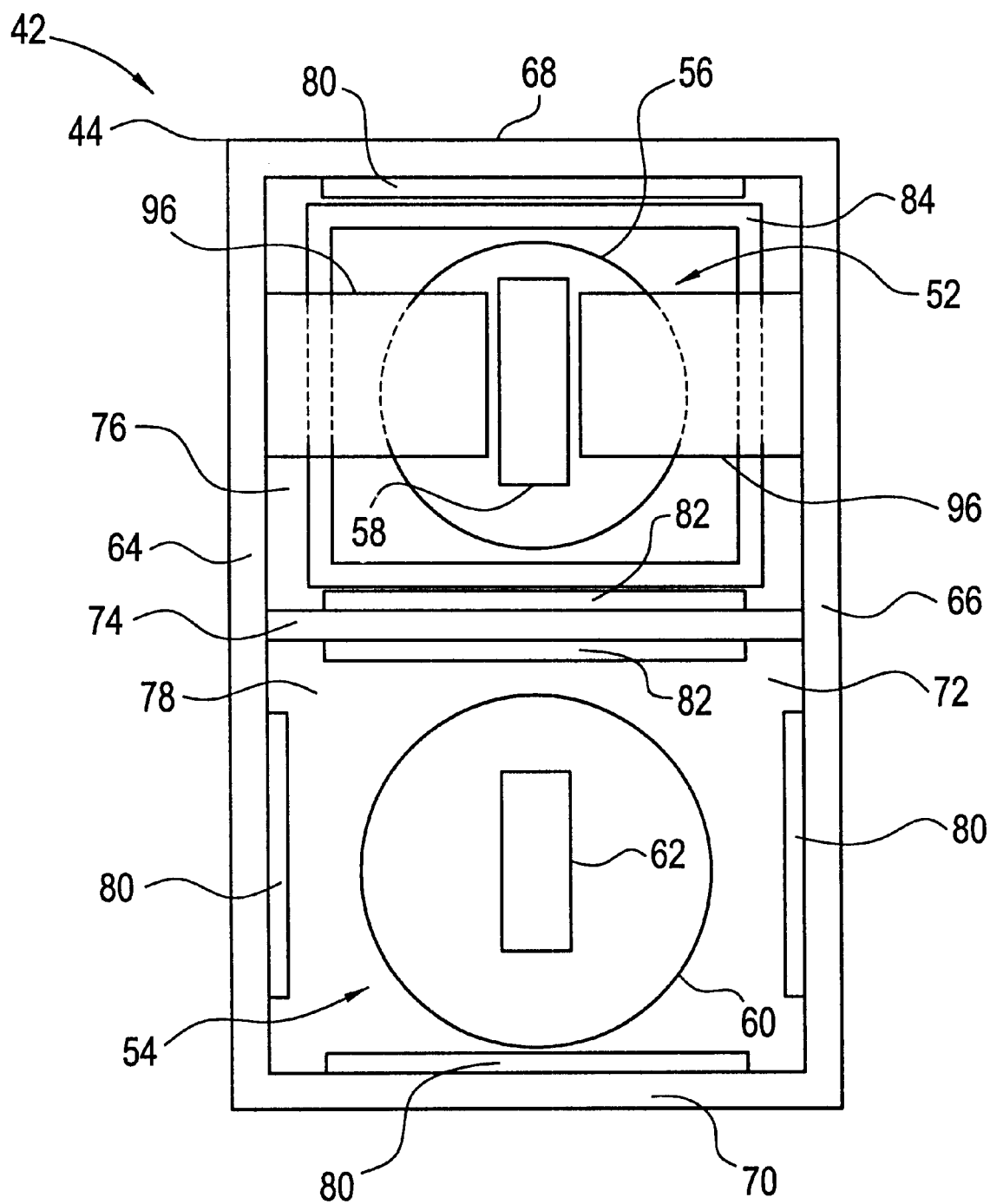
FIG. 5 is an end view of the boom assembly, illustrating the stacked arrangement of piston cylinder assemblies supported in the boom housing.

As illustrated in FIG. 5, the boom assembly main housing 44 has a box-like construction of vertical side walls 64 and 66 integrally connected to a top wall 68 and a bottom wall 70. The connected walls 64–70 form an enclosure 72 for housing the piston cylinder assemblies 52 and 54 in overlying spaced parallel relation. The enclosure 72 is divided by a plate 74 that extends horizontally between side walls 64 and 66 to form an upper chamber 76 and a lower chamber 78 within housing 44.

As further illustrated in FIG. 5, the interior surfaces of walls 64, 66, 68 and 70 are lined with a plurality of wear plates 80. Also, the top and bottom surfaces of the plate 74 have wear plates 82 secured thereto. The wear plates 80 and 82 extend the length of the main housing 44. For clarity of illustration the wear plates secured to the side walls 64 and 66 in the housing upper chamber 76 have been deleted. The wear plates 80 shown attached to the side walls 64 and 66 in the lower chamber 78 are also mounted on the side walls 64 and 66 in the upper chamber 76.

The wear plates 80 and 82 slidably support within the main housing 44 a pair of cylinder housings 84 and 85. Again for purposes of illustration, only cylinder housing 84 is shown in the upper chamber 76. It should be understood that a lower cylinder housing 85, shown in FIGS. 4 and 6–8, is positioned within the lower chamber 78 to ride on the surfaces of the wear plates 80 and 82. The upper and lower cylinder housings 84 and 85 surrounding the respective cylinder piston assemblies 52 and 54 within the boom assembly main housing 44 provide additional rigidity in the extension and retraction of the assemblies 52 and 54 to resist twisting and bending during movement of the boom assembly 42 under load, particularly in the extended position. At all times during extension and retraction of the piston cylinder assemblies 52 and 54, the assemblies are positioned within the main housing 44 and/or the individual cylinder housings 84 and 85.

As shown in FIGS. 1 and 2, the boom assembly 42 is pivotally mounted at one end portion on the vehicle frame 14 at the operator's station 32. The opposite or free end portion of the boom assembly 44 extends over the solid deck 50 of the material handling platform. In the embodiment shown in FIGS. 1 and 2 and also in FIG. 9, the operator's station 32 is separated from the materials handling platform 50 by a plate 86 that extends the width of the deck 50 between the traction devices 20. The plate 86 has an elongated opening 88 for receiving the boom assembly 42. The dimensions of the opening 88 cutout in the plate 86 exceed the cross-sectional area of the boom assembly 42 to facilitate unobstructed extension and retraction of the boom assembly, as well as vertical pivotal movement through a limited range. To provide a wider range of vertical pivotal movement of the boom assembly 42, the plate 86 dividing the operator's station 32 from the materials handling platform is deleted.

With the provision of the opening 88 in plate 86, the range of vertical pivotal movement of the boom assembly 42 is limited. Nevertheless, the assembly 42 is pivotally mounted on the vehicle frame 14 at the operator's station 32. The pivotal connection is formed by a pair of parallel spaced brackets 90 (FIGS. 1–4) welded to the frame 14 and extending vertically adjacent the operator's controls 36. One end 92 of cylinder housing 84 is slidable relative to the boom assembly 42 and is pivotally connected by a pin that extends through the brackets 90 and the end 92 of cylinder housing 84. In addition, the end of piston cylinder assembly 52 is also connected with the housing end 92 to the brackets 90. With this arrangement the cylinder portion 56 of assembly 52 is fixed on the vehicle frame 14 together with the cylinder housing 84. Upon extension and retraction of the boom assembly 42, the cylinder portion 56 and the cylinder housing 84 do not move other than through a limited range of vertical pivotal movement on the brackets 90.

The piston 58 of piston cylinder assembly 52 is extensible and retractable relative to the fixed cylinder portion 56. The free end of piston 58 is connected by a pin 94, shown in FIGS. 3 and 4, to a boss that is welded to the boom assembly housing 44 in the upper chamber 76 as shown in FIG. 5. Extension and retraction of the piston 58 relative to the cylinder portion 56 advances the boom housing 44 together with the piston cylinder assembly 54 positioned in the boom housing lower chamber 78 from the retracted position shown in FIG. 3 to the extended position shown in FIG. 4. Thus, extension and retraction of the piston 58 relative to the cylinder portion 56 moves the boom housing from the retracted position in FIG. 3 to the extended position in FIG. 4.

To extend the boom assembly 42 further when the boom housing 44 is in the extended position shown in FIG. 4, the lower piston cylinder assembly 54 is actuated. The cylinder portion 60 of assembly 54 is fixedly connected by a pin 98 to the lower end of housing 44 adjacent the brackets 90. The lower cylinder housing 85 is slidably supported on the wear plates 80 and 82 in surrounding relation with the cylinder portion 60 in the lower chamber 78 of boom housing 44. End portion 100 of housing 85 is slidably movable within boom housing 44 relative to the cylinder portion 60 which is fixed within the boom housing 44. End 102 of piston 62 is connected by a pin 104 to end 106 of cylinder housing 85. Thus, upon actuation of the piston cylinder assembly 54 to extend the piston 62, the lower cylinder housing 85 moves with the piston 62 to extend from the boom assembly housing 44 to complete the extension of the boom assembly 42. The boom assembly 42 is shown in a fully extended position in FIG. 4 where the lower cylinder housing 85 is fully extended from the boom housing 44. The cylinder housing end portion 100 is retained within the boom housing 44.

During extension of the piston 62 from the lower chamber 78 of the boom assembly housing 44, the lower cylinder housing 85 remains in surrounding relation with the piston 62. The wear plates 80 and 82 surrounding the piston cylinder assembly 54 maintain axial extension and retraction of the piston 62 relative to the cylinder portion 60. The surrounding cylinder housing 85 prevents twisting or bending of the piston 62.

The support provided by the main housing 44 centrally of the boom assembly 42 and the upper cylinder housing 84 at the rearward end portion of the boom assembly 82 maintains a rigid stabilized telescoping assembly capable of withstanding substantial loads in the movement of equipment in excess of 30 tons. This capability was not heretofore available with a conventional piston cylinder assembly or a multi-stage jack. In all stages of extension and retraction of the boom assembly 42 the piston cylinder assemblies 52 and 54 are capable of withstanding heavy loads and provide a telescoping boom capable of moving heavy equipment and materials onto and off of the vehicle material handling platform 50.

The telescoping boom assembly 42 supported in the above-described manner on the materials handling vehicle 10 is capable of performing a wide variety of materials handling operations. The scope and extent of the operations is determined, in part, by the attachment connected to the free end portion of the boom assembly 42. One example of an attachment connected to the end of the boom assembly 42 is illustrated in FIGS. 3, 4, 6, and 7 in the embodiment of a hook mechanism generally designated by the numeral 108. The hook mechanism 108 is connected to the end of the boom assembly 42 to facilitate ease of exchange with another type of materials handling device, such as a multi-purpose bucket for conducting underground mining operations as disclosed in U.S. Pat. No. 4,411,583.

Figure 6:
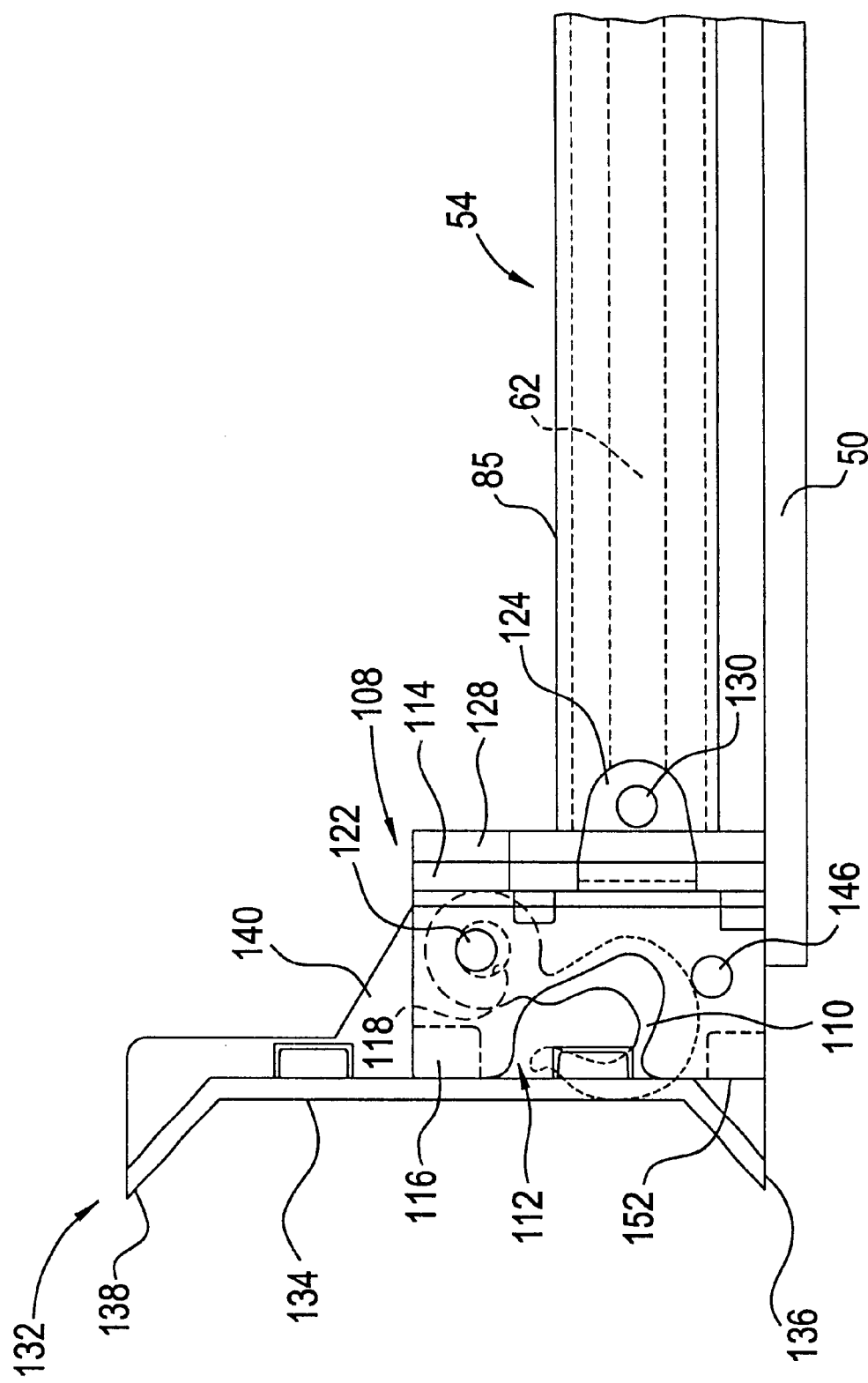
FIG. 6 is a fragmentary view in side elevation of the boom assembly, illustrating a pusher plate and a hook mechanism connected to the end of the boom assembly.

In one embodiment the hook mechanism 108 includes a single hook 110 as shown in FIGS. 3, 4, 6, and 7. In a second embodiment a pair of hooks 110 are used, as shown in FIG. 2. In both embodiments, the hook is pivotally retained in a socket assembly 112 (FIGS. 6 and 7) bolted to the lower end of the cylinder housing 85. The socket assembly 112 is formed by a base plate 114 welded to a pair of parallel spaced side plates 116 forming a cavity closed at one end by the connection of plates 116 to plate 114 and open at the opposite end for receiving hook 110. The hook 110 is positioned within the cavity between the side plates 116, as shown in FIG. 6. The hook 110 includes an opening 118 which when aligned with openings 120 in plates 116 receives a pin 122 to pivotally connect the hook 110 within the cavity of the socket assembly 112.

Secured to and extending from the socket assembly base plate 114 is a pair of ears 124, and holes 126 extend through the ears 124. Positioned oppositely of the socket assembly base plate 114 is an abutment plate 128 connected to the free end of the cylinder housing 85. The abutment plate 128 has an opening for receiving the pair of ears 124 so that the base plate 114 abuts against the plate 128 where the plates 114 and 128 are bolted together. In this position the ears 124 are positioned within the cylinder housing 85, and the end of the piston 62 of the piston cylinder assembly 54 is positioned between the ears 124, as shown in FIG. 6. A pin 130 extends through the opening in the end of the piston 62 aligned with bores 126 of ears 124.

Upon actuation of the piston cylinder assembly 54, piston 62 extends from the cylinder 60 to extend the boom second end portion relative to the boom first end portion. Accordingly, retraction of the piston 62 into the cylinder 60 retracts the boom second end portion into the boom first end portion. Selective extension and retraction of the piston 62 relative to the cylinder 60 and the piston 58 relative to the cylinder 56 adjusts the length of the boom assembly 42. Throughout extension and retraction of the piston 62 relative to the cylinder 60, the lower cylinder housing 85 remains in surrounding relation with the piston 62 because the end of the housing 85 is bolted to the socket assembly 112.

Figure 9:
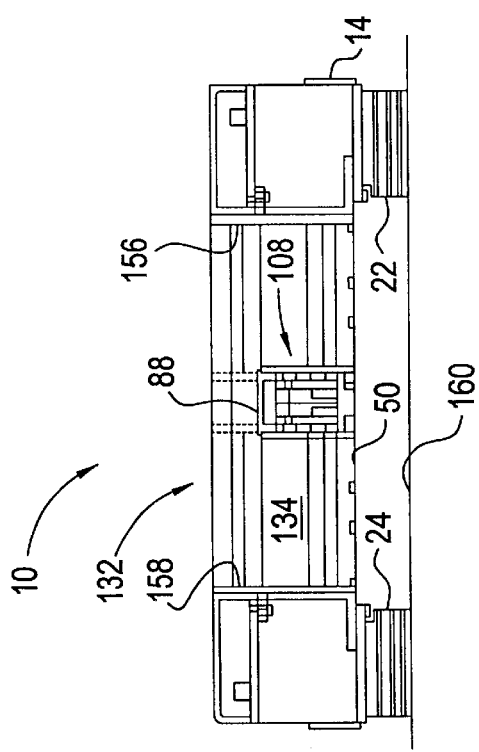
FIG. 9 is an end view of the materials handling vehicle taken along line IX—IX in FIG. 2.

In addition to the hook mechanism 108 attached to the end of the boom assembly 42, a pusher plate generally designated by the numeral 132 in FIG. 6 is releasably connected to the end of the boom assembly 42. The pusher plate 132 is another example of a materials handling device which is releasably connected to the boom assembly 42 for performing materials handling operations. The pusher plate 132 has a configuration and operation corresponding substantially to a bulldozer blade. The plate 132, as illustrated in FIG. 9, extends substantially the width of the solid deck 50 between the traction devices 20. The pusher plate 132 has a generally concave face 134 that extends from a bottom edge 136 that rides on the solid deck 50 of the vehicle frame 14 to an upper edge 138 that preferably extends above the height of the plate 86 that partitions the operator's station 32 from the materials handling platform.

Figure 7:
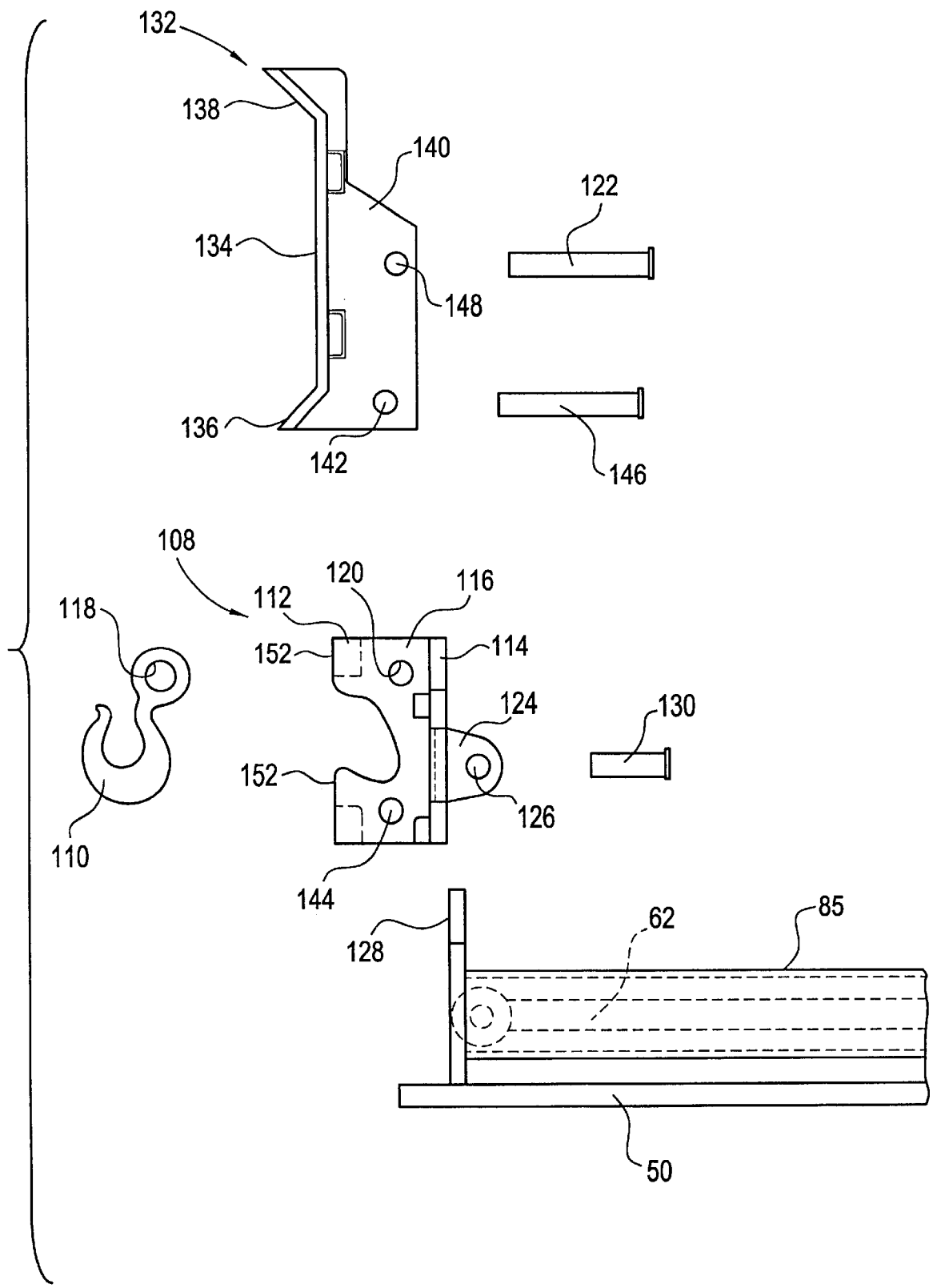
FIG. 7 is a fragmentary, exploded elevational view of the boom assembly shown in FIG. 6, illustrating the connection of the hook mechanism and the pusher plate to the end of the boom assembly.

The pusher plate 132 is mounted in one embodiment to the end of the boom assembly 42 without the provision of the hook mechanism 108 and socket assembly 112. In another embodiment it is attached to the end of the boom assembly 42 in combination with the hook mechanism 108. A quick release pin connection is provided for efficient attachment and detachment of the pusher plate 132 to the boom assembly 42. As shown in FIGS. 6–8, when the pusher plate 132 is used in combination with the hook mechanism 108, bracket plates 140 extending rearwardly of the pusher plate 132 are positioned oppositely of side plates 116 of the socket assembly 112. Holes 142 (FIG. 7) extending through the bracket plates 140 are aligned with holes 144 in the side plates 116. Pin 146 extends through the aligned holes 142 and 144.

When the pusher plate 132 is used in combination with the hook mechanism 108, as shown in FIG. 6, the pin 122 for supporting the hook 108 in the socket assembly 112 is also connected to the pusher bracket plates 140. The plates 140 include a pair of holes 148 positioned above the holes 142 (see FIG. 7). The bracket holes 148 are aligned with the openings 120 in the socket assembly 112 so that the pin 122 (FIG. 8) extends through the aligned holes 120 and 148.

Figure 10:
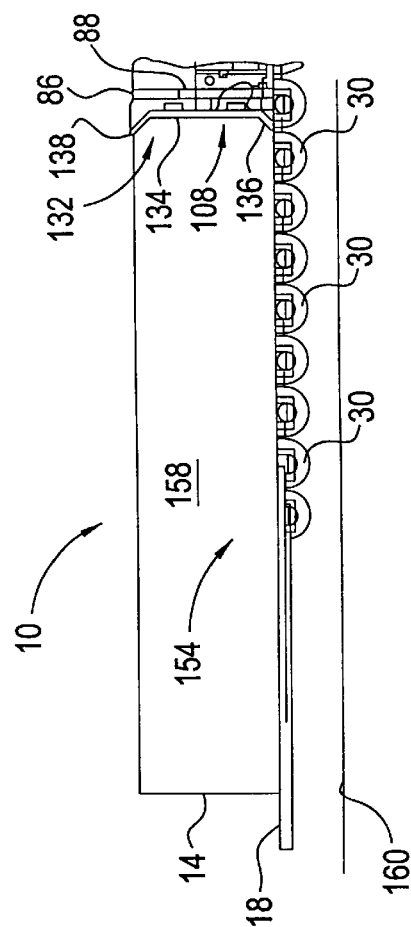
FIG. 10 is a fragmentary elevational view of the end of the materials transporting vehicle with the traction devices removed, illustrating the boom assembly in a fully retracted position.

The assembled combination of the pusher plate 132 and the hook mechanism 108 on the end of the boom assembly 142 is illustrated in FIGS. 7, 9, and 10. FIGS. 1–4 illustrate the hook mechanism 108 connected to the end of the boom assembly 42 without the provision of the pusher plate 132.

Figure 12:
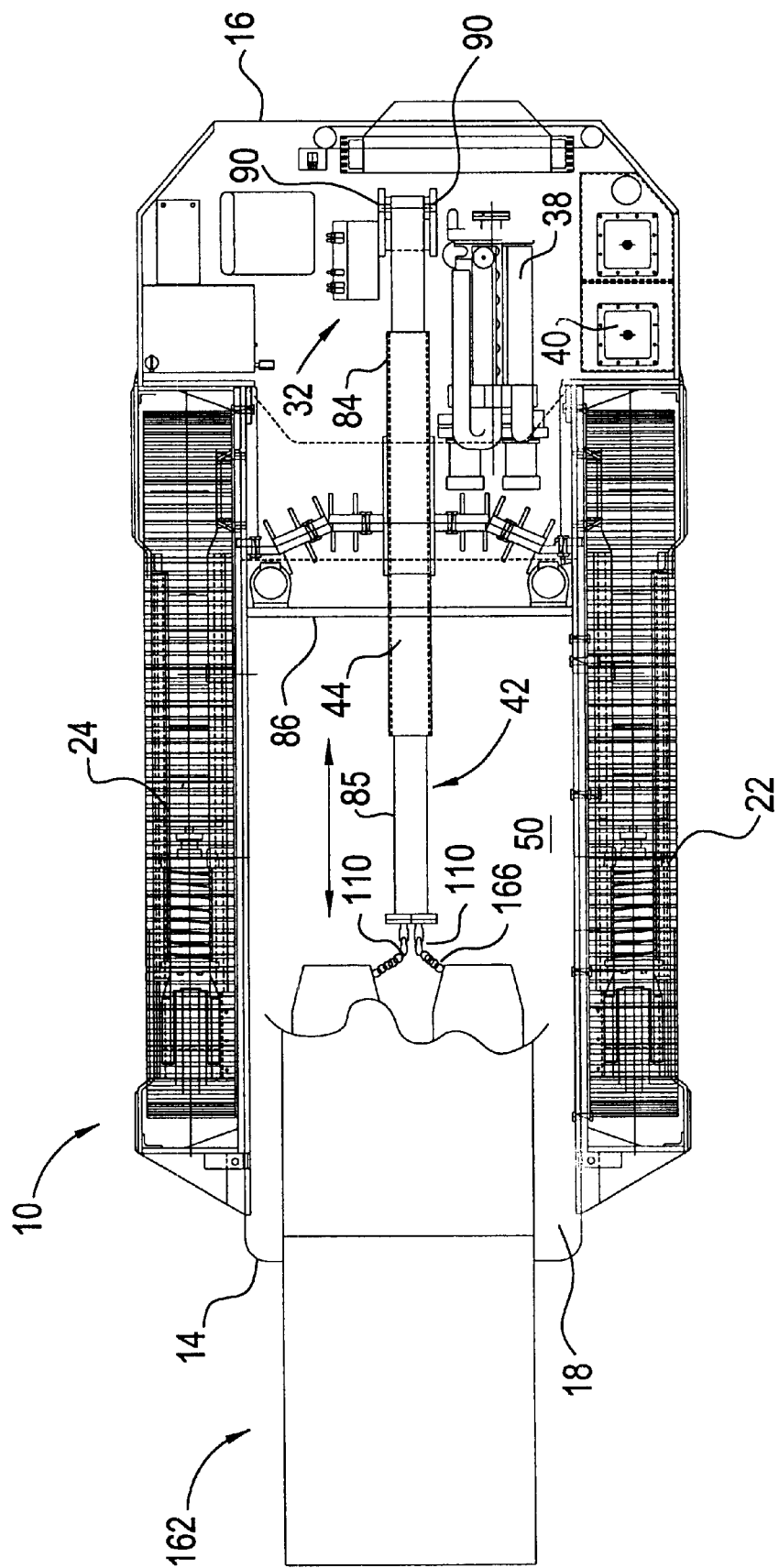
FIG. 12 is a top plan view of the materials handling vehicle shown in FIG. 1, illustrating the longwall shield being loaded onto the vehicle.
Figure 16:
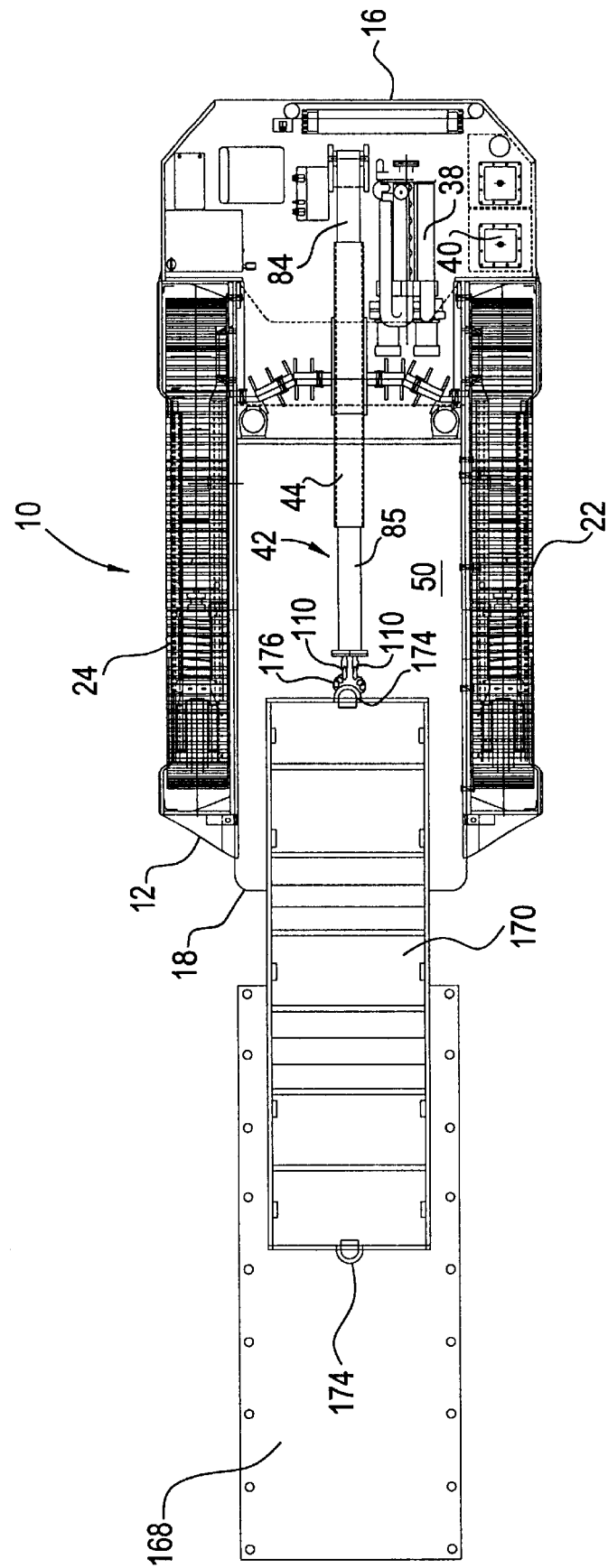
FIG. 16 is a top plan view of the materials transporting vehicle, illustrating the transfer of a pallet from the rail car onto the transporting vehicle.

When the hook assembly 108 and pusher plate 132 are used in combination on the boom assembly 42, multiple materials handling operations are performed on the vehicle 10. A pair of hooks 110 can be pivotally supported by the pin 122 on the socket assembly 112, as shown in FIGS. 2, 12, and 16. The hook 110 is movable from a retracted position in the cavity of the socket assembly 112, as shown in FIG. 6, to a position extending out of the cavity for connection by a chain or the like to a piece of equipment for loading and unloading on the solid deck 50.

Figure 11:
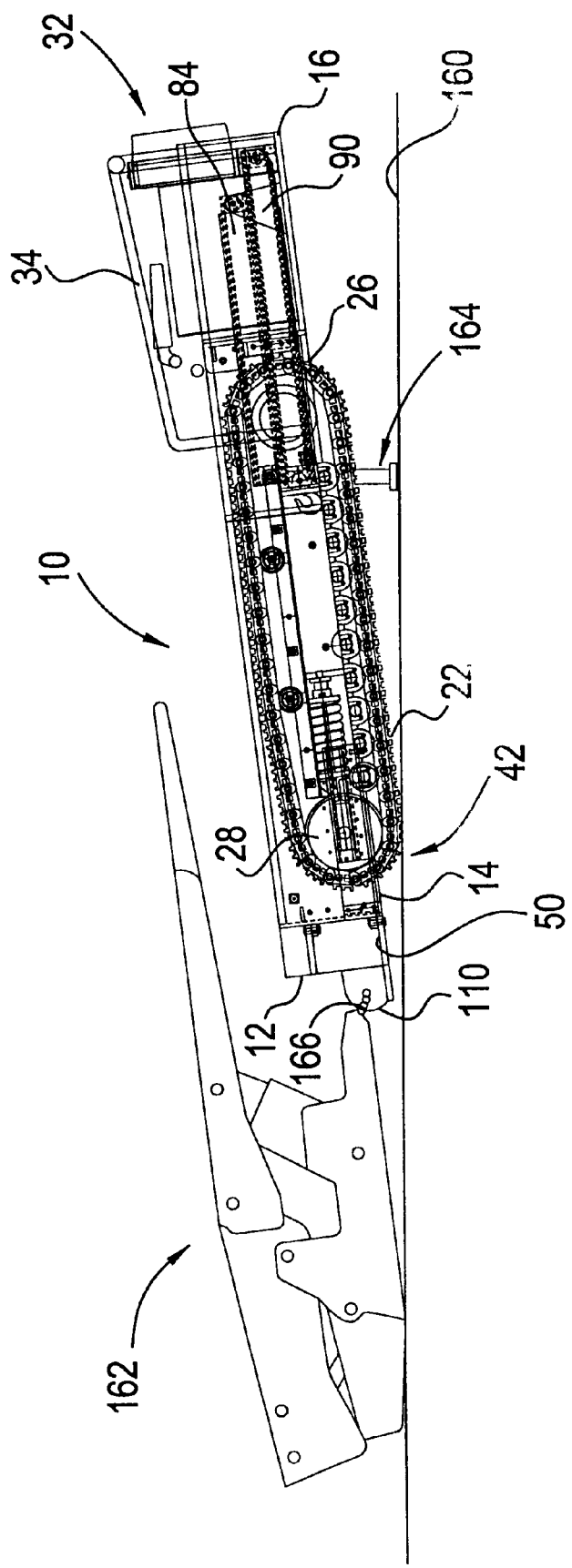
FIG. 11 is a view in side elevation of the materials transporting vehicle, illustrating loading of a longwall shield connected to the end of the boom assembly onto the vehicle.
Figure 13:
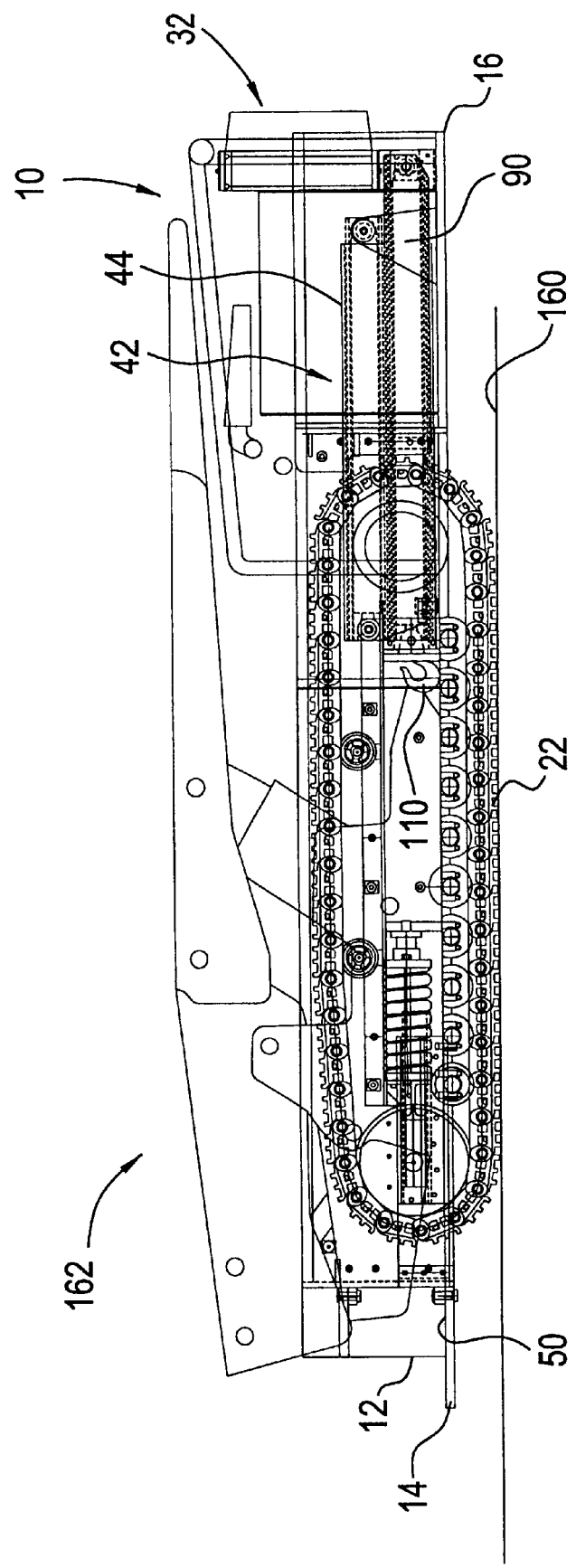
FIG. 13 is a view in side elevation of the materials handling vehicle, illustrating the longwall shield loaded on the vehicle for transporting.

In accordance with the present invention, a longwall mining machine shield 150 is loaded on and unloaded off of the deck 50, as illustrated in FIGS. 11–13. With the present invention, instead of towing the longwall shield 150 behind the vehicle 10 on the ground, the shield 150 is positioned on the vehicle 10 to a desired location in the mine for installation. At the point of installation, such as adjacent to the mine face, the boom hooks 110 are disconnected from the shield and retracted. With the hooks 110 retracted, the pusher plate 132 and socket assembly 112 are used as a ram to push the shield from the deck 50 onto the mine floor.

To facilitate the use of the boom assembly 42 as a ram to push materials and equipment off of the deck 50, the plates 116 of the socket assembly 112 provide an abutment surface 152 that surrounds the opening into the cavity for receiving the hook 110. With the above described construction of the telescoping boom assembly 42, the boom assembly can apply the necessary force to push a 40-ton longwall shield off of the deck 50 onto the mine floor.

With the above-described materials handling vehicle 10, a wide variety of tasks are performed in loading and unloading equipment from behind the vehicle or handling materials removed from the deck 50 of the vehicle 10. The provision of the solid deck 50 supported by the vehicle frame 14 between the traction devices 20 provides a containerized area for receiving and transporting loose materials. This feature is illustrated in FIGS. 9 and 10 in which a loose materials handling compartment, generally designated by the numeral 154, is provided on the vehicle frame. The compartment 154 is defined by the solid deck 50 extending from the vertical plate 86 adjacent to the operator's station 32 to the frame rearward end 18. The width of the load compartment 154 is defined by spaced apart vertical side walls 156 and 158 positioned inboard of the endless tracks 22 and 24. For purposes of clarity of illustration the tracks 22 and 24 are not shown on the vehicle 10 in FIG. 10.

By extension and retraction of the boom assembly 42 with the pusher plate 132 attached thereto loose materials are loaded and unloaded on the deck 50 in the compartment 154. In FIGS. 9 and 10, the pusher plate 132 is shown in a fully retracted position so as to allow materials to be loaded onto the deck 50 between the side walls 156 and 158. In a retracted position of the pusher plate 132 on the deck 50, a large capacity compartment 154 is available for receiving and transporting loose materials, such as gravel and the like. The material is securely contained within the compartment 154 by the surrounding structure provided by the pusher plate 132 and longitudinally extending side walls 156 and 158 that extend substantially the full height of the vehicle 10 as seen in FIG. 9. While the rearward end 18 of the vehicle frame 14 remains open, it can also be closed off by a solid plate extending between the side walls 156 and 158 to completely enclose the compartment 154.

To unload the loose materials from the compartment 154, the boom assembly 42 is actuated to advance the pusher plate 132 on the deck 50 toward the frame rearward end 18. The plate lower edge 136 slides on the deck 50. In this manner loose materials are transferred from the vehicle 10 onto the mine floor 160 or into an adjacently positioned haulage vehicle.

A principal feature of the present invention is use of the vehicle 10 to load and transport on the deck 50 mining equipment from a mine entry to any desired location for installation in the mine, such as at the mine face. A specific application of the vehicle 10 is the haulage and transportation of longwall components to the mine face. The vehicle 10 is constructed to transport heavy loads in the capacity of 30 to 40 tons so that longwall shields, crib blocks, and other longwall mining machine components can be safety and efficiently transported to the mine face. This is accomplished without the need to tow the equipment from behind the vehicle on the mine floor.

The equipment is loaded onto the deck and transported by the vehicle 10. This is clearly illustrated in the operation of loading a longwall shield generally designated by the numeral 162 in FIGS. 11–13 onto the vehicle 10. To facilitate loading of the shield 162 the vehicle 10 is provided with an elevation jack generally designated by the numeral 64 in FIG. 11. The jack 164 is conventional in design and is attached to the vehicle frame 10 to extend downwardly into contact with the mine floor 160. The jack is extended to elevate the frame front end 16 to lower the deck 50 at an angle to permit the shield 162 to be transferred from the mine floor 160 onto the deck 50.

As seen in FIG. 11, loading of the shield 162 onto the vehicle deck 50 is accomplished by extending the boom assembly 42 with the hook 110 attached to the end of the boom. In FIG. 12 a pair of hooks 110 is connected by a chain 166 to the base of the shield 162. With the shield securely connected to the boom assembly 42, the shield 162 is pulled onto the deck 50 by retracting the boom assembly 42 from the length illustrated in FIGS. 11 and 12 to the length illustrated in FIG. 13.

With the boom 42 in the fully retracted position as shown in FIG. 13, the shield 162 is securely positioned on the vehicle deck 50 for transporting to a location for installation in the mine. The reinforced structure of the vehicle 10 allows longwall shields, ranging in weight between 30–40 tons, to be safely and efficiently moved throughout the mine on the vehicle 10. This eliminates the problems associated with towing the shield from behind a haulage vehicle.

Figure 14:
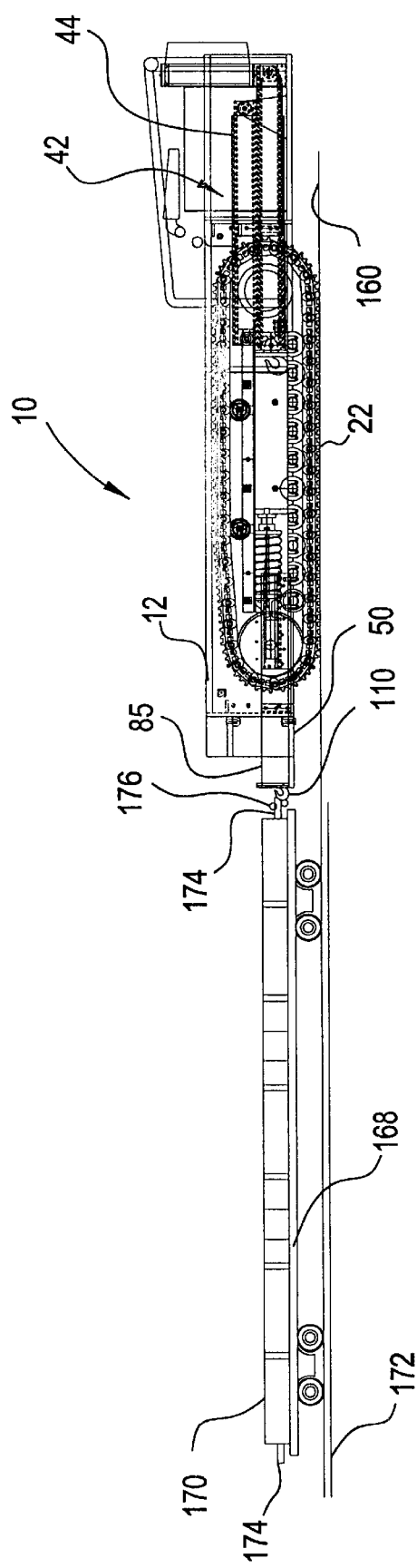
FIG. 14 is a view in side elevation of the materials handling vehicle, illustrating the extended boom assembly engaged to a pallet to be transferred from a rail car onto to the materials transporting vehicle.
Figure 15:
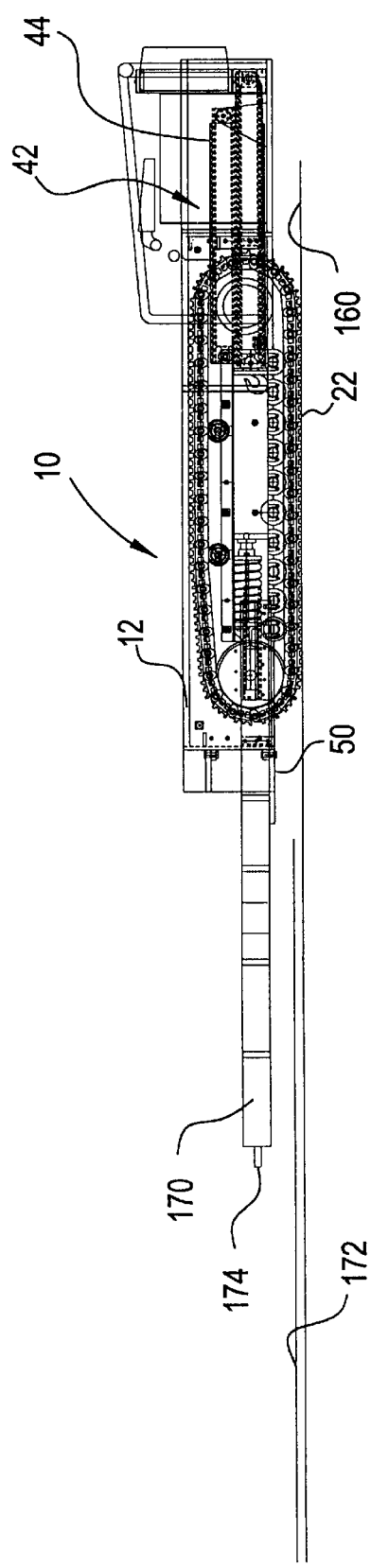
FIG. 15 is a view similar to FIG. 14, illustrating the pallet loaded onto the vehicle.

Another example of the materials handling and loading operations performed by the vehicle 10 is illustrated in FIGS. 14–16 with a sequence of operations illustrated in FIGS. 17–23. With the open deck construction of the handling vehicle 10, movement of materials and equipment onto and off of the deck 50 is efficiently accomplished. It is common practice in underground mining operations to transport materials throughout the mine on pallets. The pallets loaded with equipment and supplies are transported by rail car to the mine. At the mine, the materials are off-loaded from the pallets onto suitable haulage vehicles.

The handling vehicle 10 of the present invention is operable to transport loaded pallets from the rail car to the desired location in the mine. The loaded pallets are transferred directly from the rail car onto the vehicle 10. The vehicle 10 transports the loaded pallets to a location in the mine where the pallets are off-loaded from the vehicle 10 or the materials are transferred from the pallets on the vehicle 10.

FIGS. 14–16 illustrate one method of transferring pallets from a rail car onto the vehicle 10. As illustrated in FIGS. 14 and 15, a rail car 168 transports a pallet 170 on rails 172 to a point where the pallets are transferred to the handling vehicle 10. It should be understood that the pallets 170 are loaded with equipment or supplies for use in the mine. For clarity of illustration the pallets 170 are not illustrated with a load, but it should be understood that the desired equipment or materials is loaded on the pallets 170. In a conventional pallet system, the pallet 170 shown in FIG. 14 includes a hitch 174 positioned at opposite ends of the pallet. The hitch 174 is engaged by a chain 176 that is connected to a pair of hooks 110 extending from the free end portion of boom assembly 42.

To facilitate transfer of a pallet 170 from the rail car 168 onto the deck 50 of the handling vehicle 10, the vehicle 10 is initially maneuvered into position to align the deck 50 longitudinally with the pallet 170 on the rail car 168. This provides a direct line of action for connection of the boom assembly 42 to the pallet 170.

Once in position where the deck 50 is longitudinally aligned with the pallet 170 on the rail car 174, the boom 42 is extended so that hooks 110 are attached by the chain 176 to the pallet hitch 174. When the connection is completed, the boom assembly 42 is retracted to pull the pallet 170 from the rail car 168 onto the deck 50. This maneuver is illustrated in FIG. 16.

When the boom assembly 42 is fully retracted, transfer of the pallet 170 from the rail car 168 to the vehicle 10 is completed. At this point the rail car is moved away from the pallet 170 which remains securely positioned on the vehicle 10, as illustrated in FIG. 15. During transport of the pallet 170 loaded on the vehicle 10, the pallet remains engaged by the hooks 110 to the boom assembly 42. This prevents movement of the pallet 170 on the vehicle deck 50.

FIGS. 17–23 illustrate another method for transferring a loaded pallet 170 from a rail car 168 onto the deck 50 of the handling vehicle 10. In this method the vehicle 10 is positioned perpendicular to the rail car 168 or any other type of vehicle that transports the pallet 170 for unloading onto the vehicle 10. In a manner similar to the method illustrated in FIGS. 14–16, the hooks 110 at the end of the boom assembly 42 are attached by a chain 178 to the pallet hitch 174. A longer chain 178 is required in the method of transfer illustrated in FIGS. 17–23 than the method illustrated in FIGS. 14–16. Once the connection of the boom assembly 42 to the pallet 170 is completed, the pallet 170 is transferred from the rail car 168 to the vehicle 10.

Figure 23:
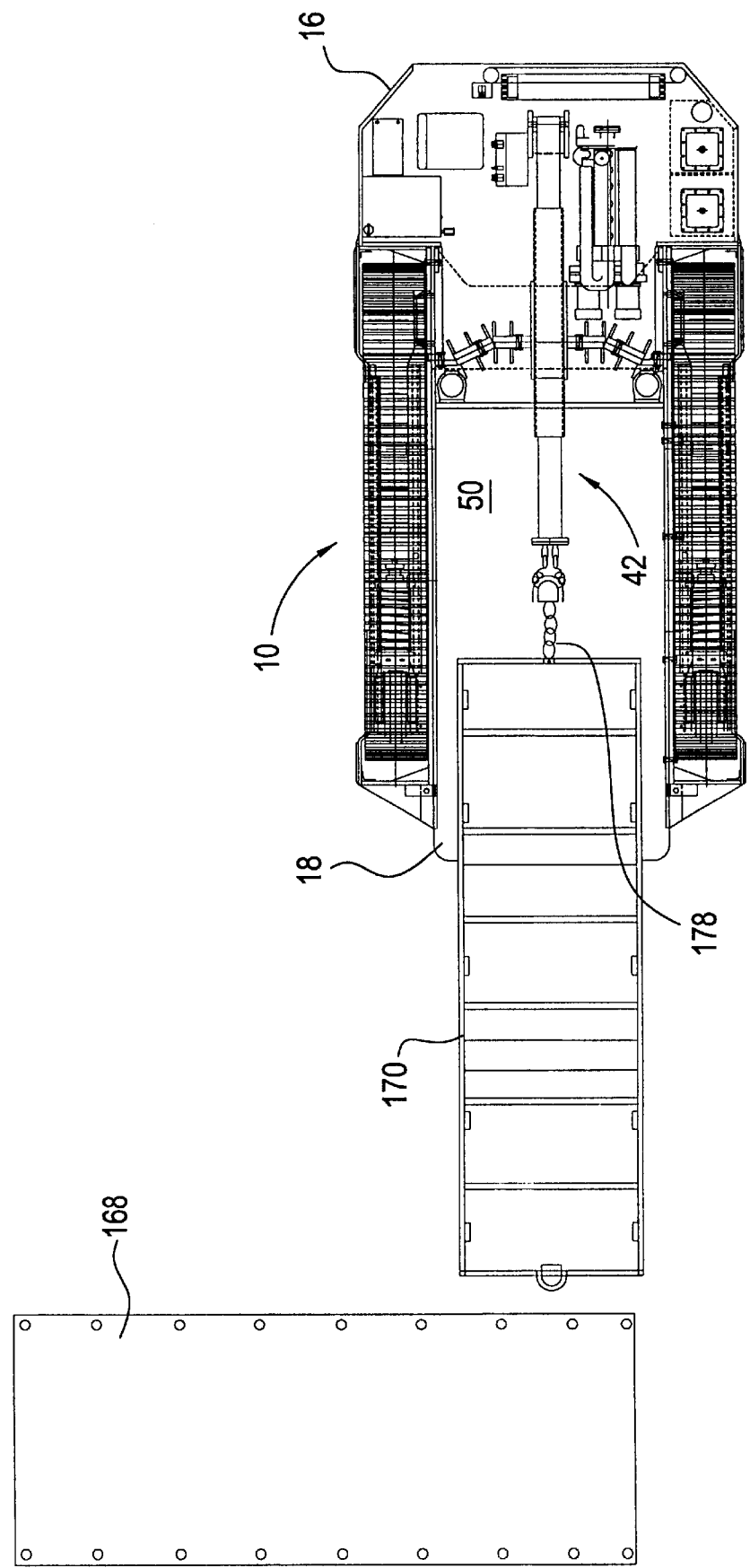

In comparison with the method illustrated in FIGS. 14–16, the unloading of the pallet 170 shown in FIGS. 17–23 is accomplished by tramming the vehicle 10 away from the rail car 168 to allow the pallet 170 to shift or pivot on the rail car 168 from a position perpendicular to the deck 50 to where the pallet 170 is longitudinally aligned with the deck 50 as shown in FIG. 23. As the vehicle 10 is advanced away from the rail car 168, the pallet 170 remains on the rail car and pivots to align the pallet 170 with the vehicle deck 50.

Figure 17:
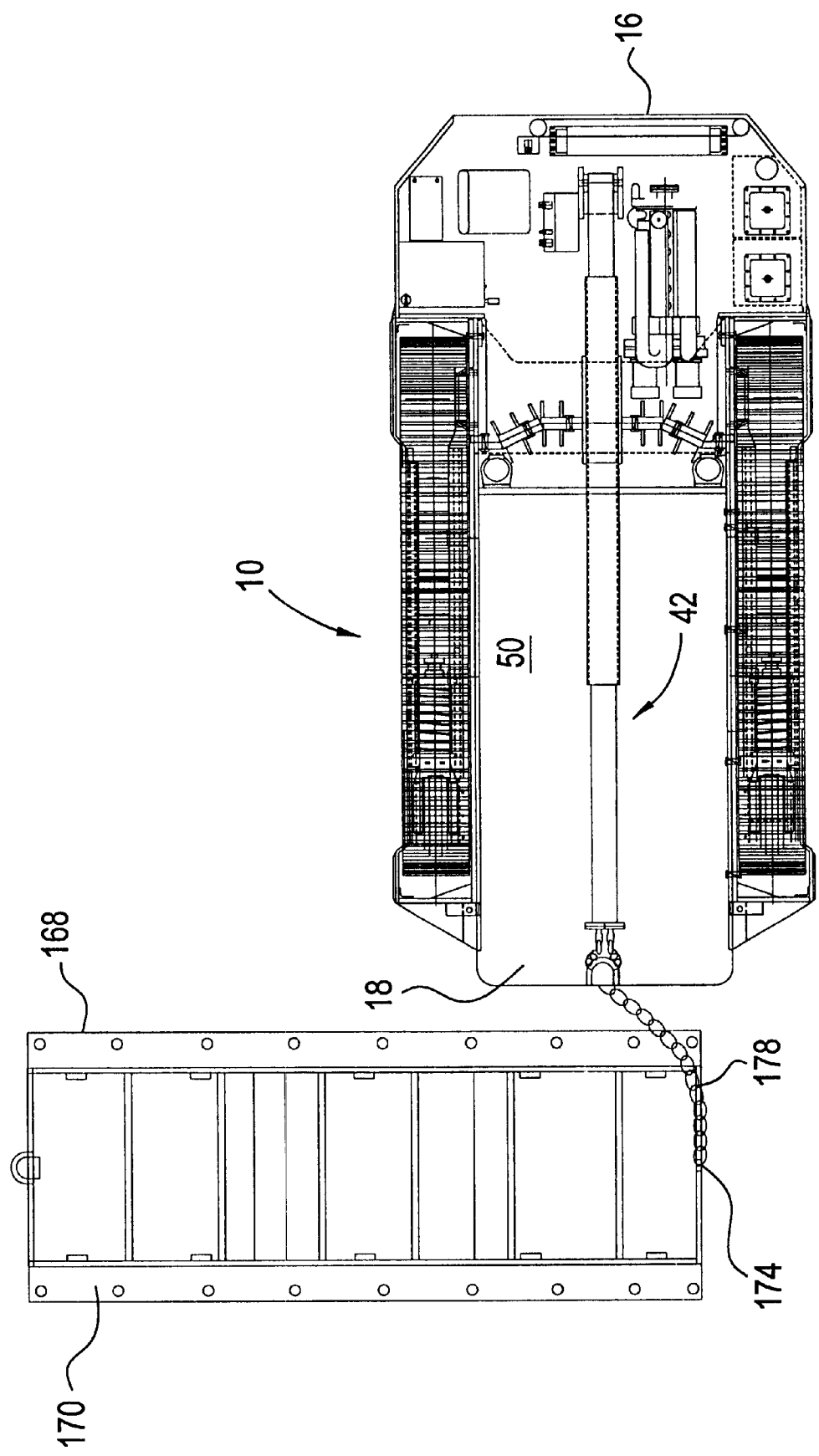
FIGS. 17–23 are schematic top plan views of the materials transporting vehicle, illustrating a method for transferring a pallet from a rail car onto the platform of the transporting vehicle.
Figure 18:
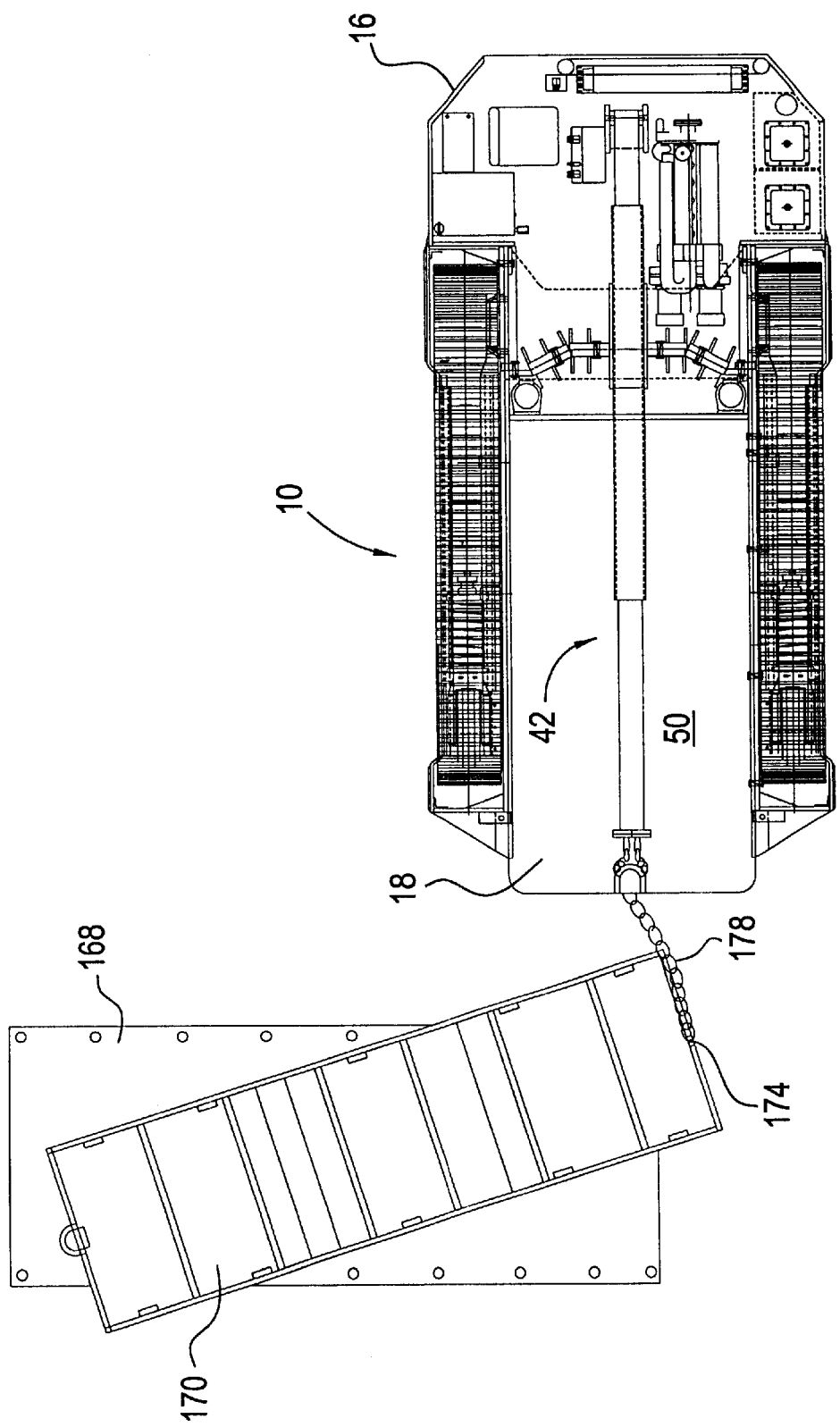
Figure 19:
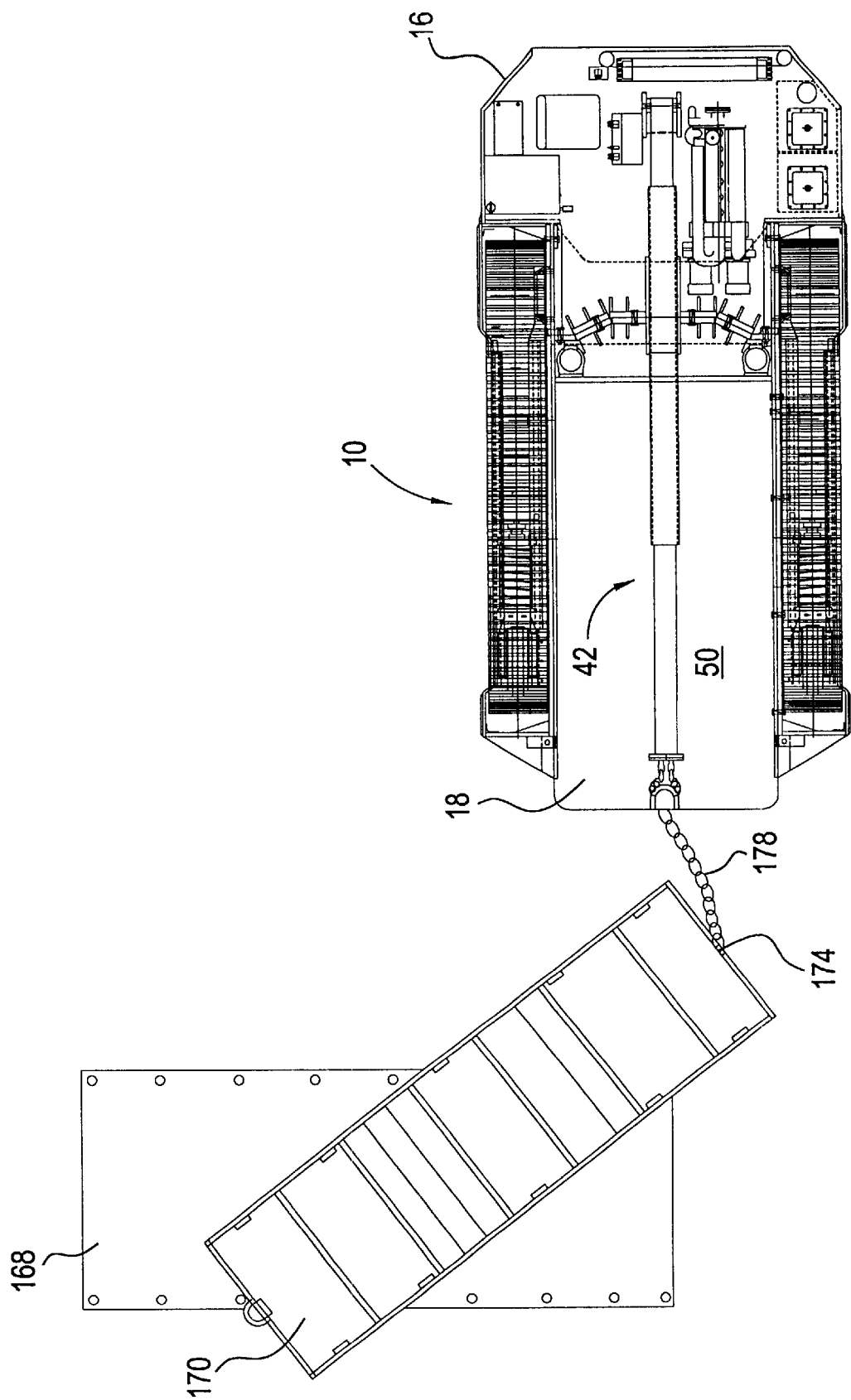
Figure 20:
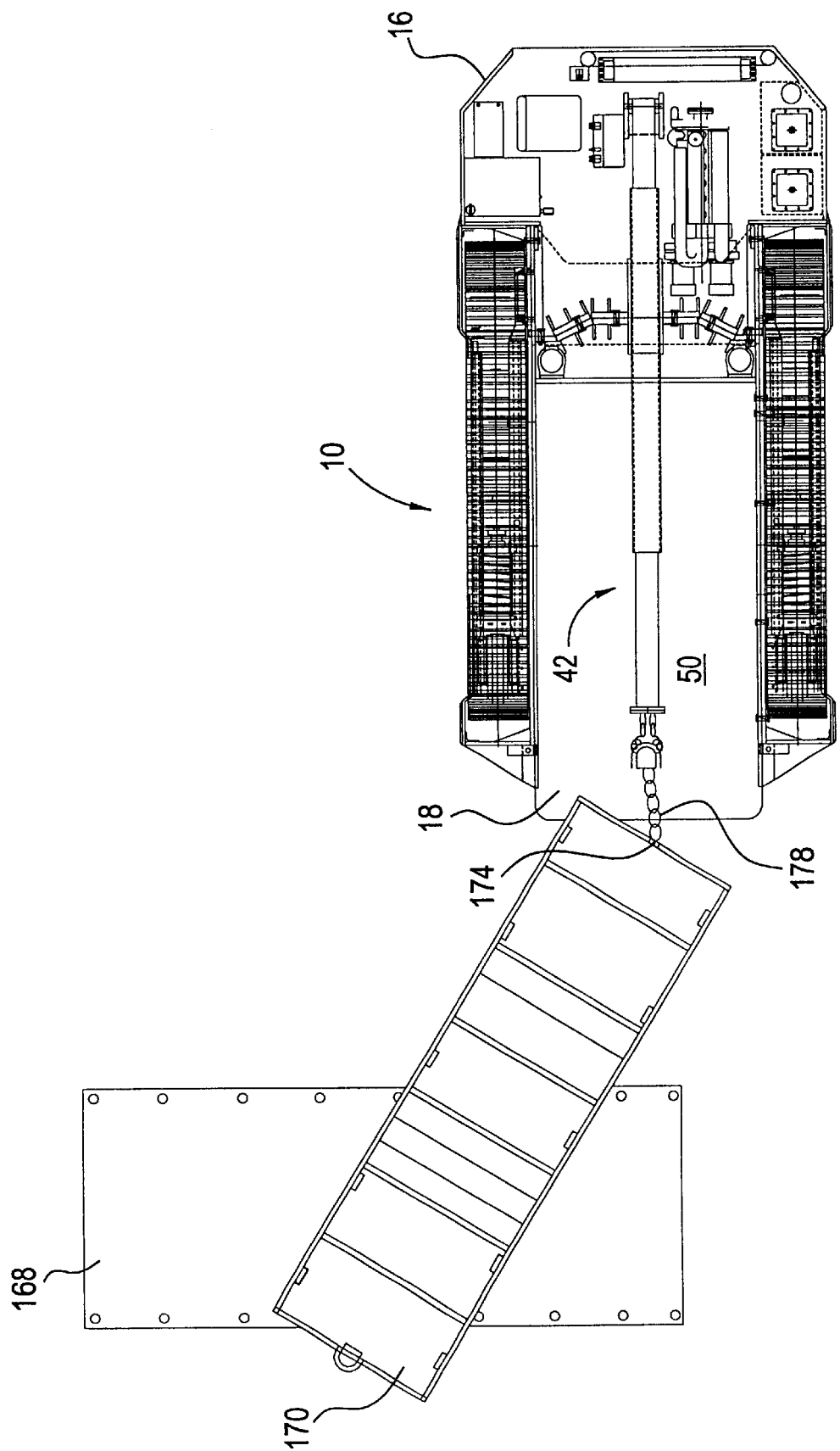
Figure 21:
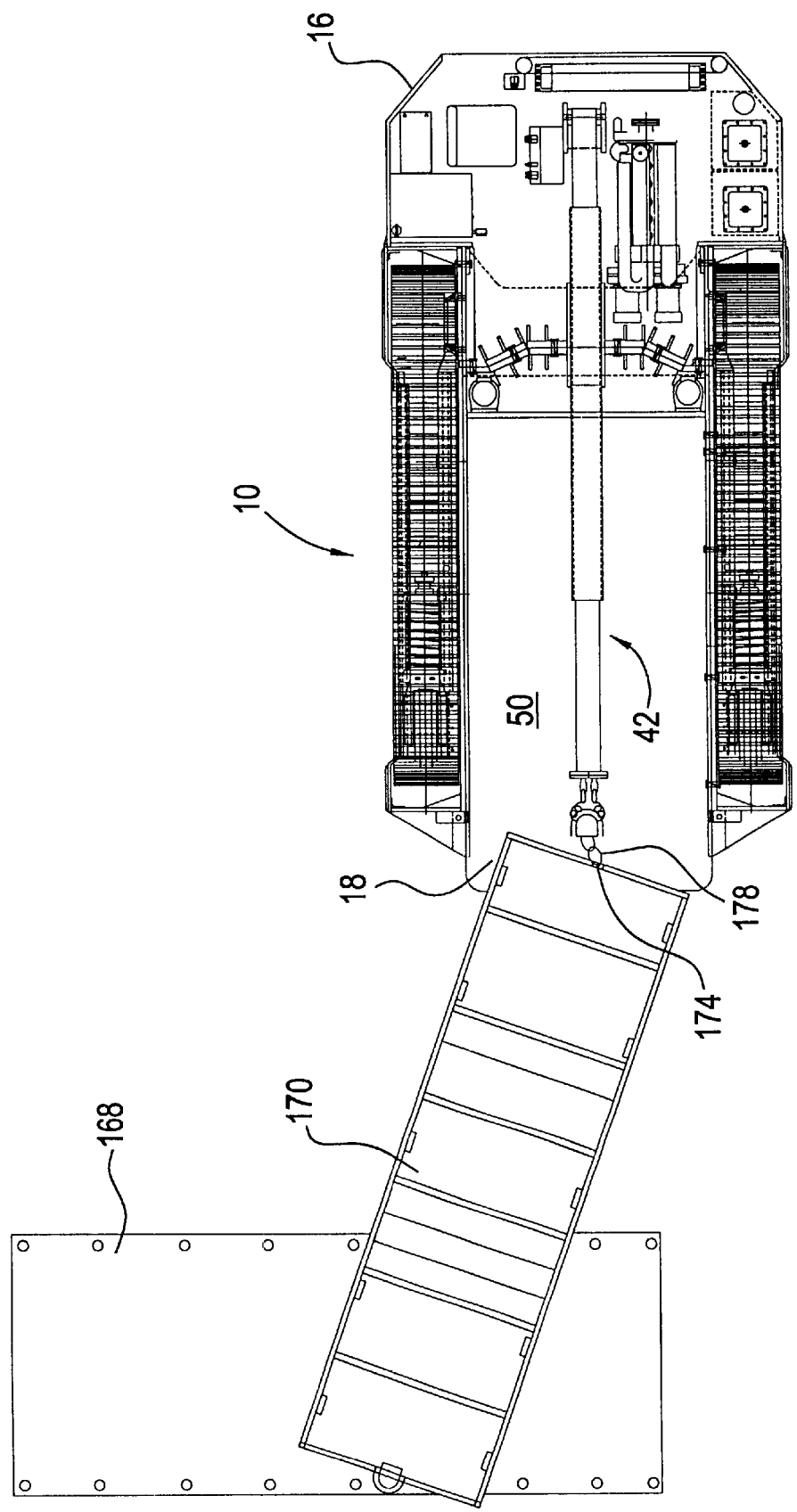
Figure 22:
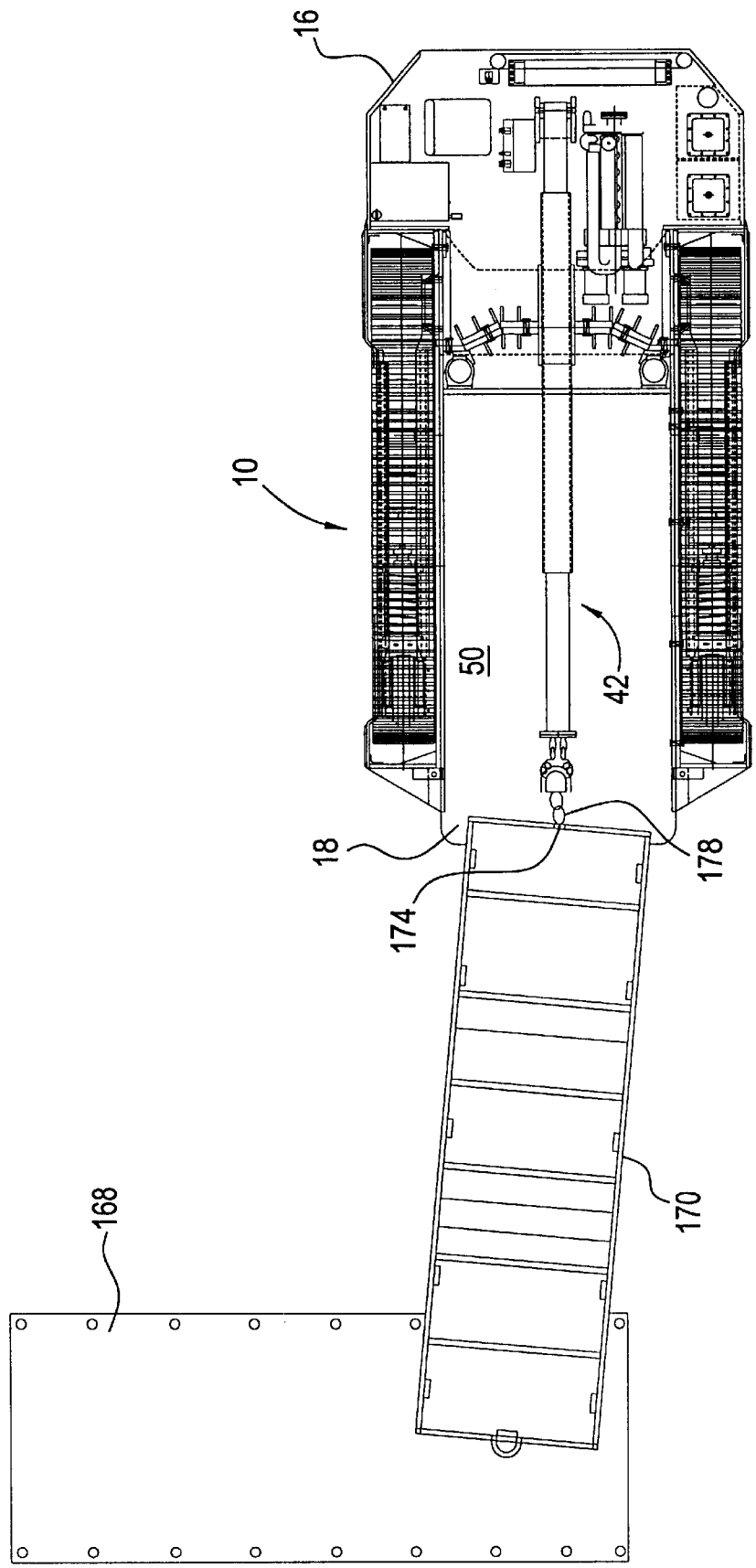

During the initial movements as shown in FIGS. 17–19, the boom assembly 42 remains fully extended as the vehicle 10 is trammed away from the railcar 168. During this stage of movement the pallet 170 pivots on the railcar 168. When the pallet 170 begins to come into longitudinal alignment with the deck 50, as shown in FIG. 20, the boom assembly is partially retracted to draw the front end of the pallet 170 onto the deck 50 while a portion of the pallet remains supported by the rail car 168. Continued tramming of the vehicle 10 and retraction of the boom assembly 42 pulls the pallet 170 into longitudinal alignment with the deck 50. When the pallet 170 is longitudinally aligned with the deck 50, the boom is further retracted to pull the pallet 170 off of the rail car 168 and onto the deck 50. The pallet 170 remains connected to the boom assembly 42 as the vehicle 10 transports the pallet and its load to the desired location for unloading.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A materials transport vehicle for use in an underground mine comprising:

a mobile vehicle frame mounted on a ground engaging traction device for propelling the transport vehicle in an underground mine, a boom assembly extending longitudinally on said mobile frame, said boom assembly including a boom housing having a first end and a second end, an extension mechanism supported by said boom housing for movement between an extended position and a retracted position to extend and retract said boom assembly, said extension mechanism having a first end portion connected by pivot means to said mobile frame and a second end portion extending on said mobile frame forwardly from said first end portion of said extension mechanism, said extension mechanism including a pair of piston cylinders positioned in said boom housing, said boom housing forming a divided enclosure for slidably receiving first and second cylinder housing in overlying, spaced parallel relation, said pair of piston cylinders including a first piston cylinder and a second piston cylinder positioned in said first and second cylinder housings respectively to position said first and second piston cylinders in overlying, spaced parallel relation in said boom housing and stabilize said first and second piston cylinders to resist lateral twisting forces applied to said boom assembly, said first piston cylinder and said first cylinder housing pivotally connected to said mobile frame and an extensible end of said first piston cylinder connected to said boom housing, said second piston cylinder connected by a pin to one end of said boom housing and having an extensible end extendable from said boom housing on said mobile frame, said extensible end of said second piston cylinder connected to said second cylinder housing to move relative to said boom housing with said extensible end, and said extension mechanism operable upon actuation to extend said first piston cylinder to extend said boom housing on said mobile frame and extend said extensible end of said second piston cylinder and said second cylinder housing from said boom housing to move said boom assembly from a retracted position to an extended position on said mobile frame.

2. A materials transport vehicle as set forth in claim 1 which includes:

a deck underlying said boom assembly.

3. A materials transport vehicle as set forth in claim 1 which includes:

a prime mover operatively associated with said ground engaging traction device.

4. A materials transport vehicle as set forth in claim 1 which includes:

a prime mover having a pair of ground engaging traction devices, and a deck underlying said boom assembly and extending the width of said pair of ground engaging traction devices.

5. A materials transport vehicle as set forth in claim 1 in which:

said first piston cylinder is independently operated upon actuation to move said extensible end of said first piston cylinder into an extended position relative to a fixed end of said first piston cylinder and into an extended position relative to a fixed end of said second piston cylinder.

6. A materials transport vehicle as set forth in claim 5 in which:

said second piston cylinder is independently operated upon actuation to move said extensible end of said second piston cylinder into an extended position relative to a fixed end of said second piston cylinder and into an extended position relative to a fixed end of said first piston cylinder.

7. A materials transport vehicle as set forth in claim 1 in which:

said first piston cylinder is independently operated upon actuation to move said extensible end of said first piston cylinder into a retracted position relative to a fixed end of said first piston cylinder and into a retracted position relative to a fixed end of said second piston cylinder.

8. A materials transport vehicle as set forth in claim 7 in which:

said second piston cylinder is independently operated upon actuation to move said extensible end of said second piston cylinder into an extended position relative to said fixed end of said second piston cylinder and into an extended position relative to said fixed end of said first piston cylinder.

9. A materials transport vehicle as set forth in claim 1 in which:

said second piston cylinder is independently operated upon actuation to move said extensible end of said second piston cylinder into an extended position relative to a fixed end of said second piston cylinder and into an extended position relative to a fixed end of said first piston cylinder.

10. A materials transport vehicle as set forth in claim 9 in which:

said first piston cylinder is independently operated upon actuation to move said extensible end of said first piston cylinder into an extended position relative to said fixed end of said first piston cylinder and into an extended position relative to said fixed end of said second piston cylinder.

11. A materials transport vehicle as set forth in claim 1 in which:

said second piston cylinder is independently operated upon actuation to move said extensible end of said second piston cylinder into a retracted position relative to a fixed end of said second piston cylinder and into a retracted position relative to a fixed end of said first piston cylinder.

12. A materials transport vehicle as set forth in claim 11 in which:

said first piston cylinder is independently operated upon actuation to move said extensible end of said first piston cylinder into a retracted position relative to said fixed end of said first piston cylinder and into a retracted position relative to said fixed end of said second piston cylinder.

13. A materials transport vehicle as set forth in claim 1 in which:

said boom assembly has a main housing having two compartments, a piston cylinder and a piston, each compartment having at least one interior surface and a wear plate, each compartment surrounding said piston cylinder, said interior surface of each compartment being lined with said wear plate, and said wear plate slidably supporting said piston cylinder.

14. A materials transport vehicle as set forth in claim 1 which includes:

a socket assembly for receiving a materials handling device.

15. A materials transport vehicle as set forth in claim 14 in which:

said materials handling device is a hook mechanism.

16. A materials transport vehicle as set forth in claim 14 in which:

said materials handling device is a pusher plate.

17. A materials transport vehicle as set forth in claim 1 which includes:

means for elevating said frame.

* * * * *